United States Patent [19]

Hinterwaldner et al.

[11] Patent Number: 5,070,121
[45] Date of Patent: Dec. 3, 1991

[54] SOLVENT-FREE, LOW-MONOMER OR MONOMER-FREE POLYMERIZABLE HOT MELT COMPOSITION

[75] Inventors: Rudolf Hinterwaldner, Moosach-Altenburg; Georg Bolte, Vechelde, both of Fed. Rep. of Germany

[73] Assignee: Schmalbach Lubeca AG, Fed. Rep. of Germany

[21] Appl. No.: 343,945

[22] Filed: Apr. 25, 1989

[30] Foreign Application Priority Data

Apr. 26, 1988 [DE] Fed. Rep. of Germany ........ 3814111

[51] Int. Cl.$^5$ .................. C08L 33/08; C08L 33/10; C08G 63/48; C08G 63/91
[52] U.S. Cl. .......................................... 524/31; 524/32; 524/33; 524/37; 524/38; 524/39; 524/40; 524/41; 524/42; 524/43; 524/44; 524/45; 524/46; 524/68; 524/69; 524/271; 524/272; 524/524; 525/28; 525/29; 525/279
[58] Field of Search ...................... 524/37, 31, 32, 33, 524/38, 39, 40, 41, 42, 43, 44, 45, 46, 68, 69, 271, 272, 524; 525/28, 29, 279

[56] References Cited

U.S. PATENT DOCUMENTS 3,896,069 7/1975 Kosaka et al. .................. 525/222
4,561,950 12/1985 Leo .................................. 525/29

*Primary Examiner*—Nathan M. Nutter

[57] ABSTRACT

The invention concerns a solvent-free, polymerizing hotmelt substance free of, or low in monomers, for corrosion- and/or abrasion proofing and/or forming a protective film with barrier properties on a real substrates and molded bodies made of metal, plastic, cellulose materials and/or inorganic materials, in particular for wrapping purposes, and consisting of (a) one or more polymerizing polymers containing hydroxyls with an average molecular weight ($\overline{M}_w$) between 1,000 and 500,000 and with a glass transition temperature ($T_g$) $\geq$ 20° C., and/or (b) one or more polymerizing, linear, unbranched and/or unbranched polyesters and/or their copolymers with an average molecular weight ($\overline{M}_w$) between 900 and 50,000 and with a glass transition temperature ($T_g$) $\geq$ −50° C., and/or (c) a polymerizing oligomer bearing ethylene-unsaturated groups of acryl-, methacryl-, ether-, ester-, urethane-, amide-, imide-, epoxy-, siloxane-, phenol-, novolak- and/or mercapto-compounds with an average molecular weight ($\overline{M}_w$) between 400 and 10,000, and (d) where called further known additives, which is characterized by containing such components (a), (b) and/or (c) which were functionalized with one or more dimeric and/or oligomeric acrylic acid(s) of the general formula

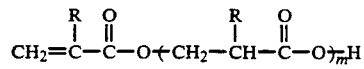

wherein R=H, —CN, halogen and/or an alkyl group with 1 to 4 C atoms, and m is a number between 1 and 5, and it further concerns a process for the preparation of said substance.

30 Claims, 3 Drawing Sheets

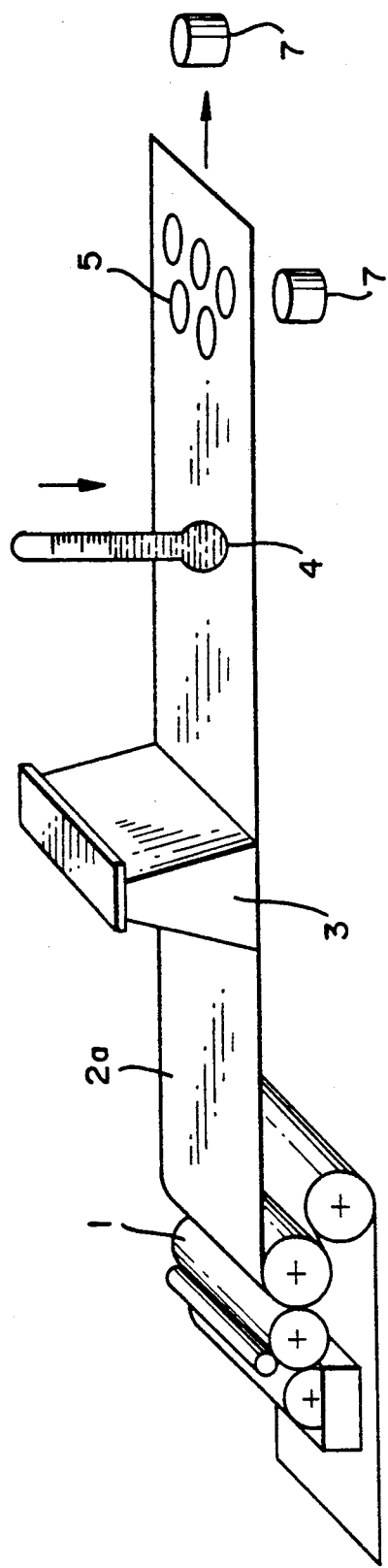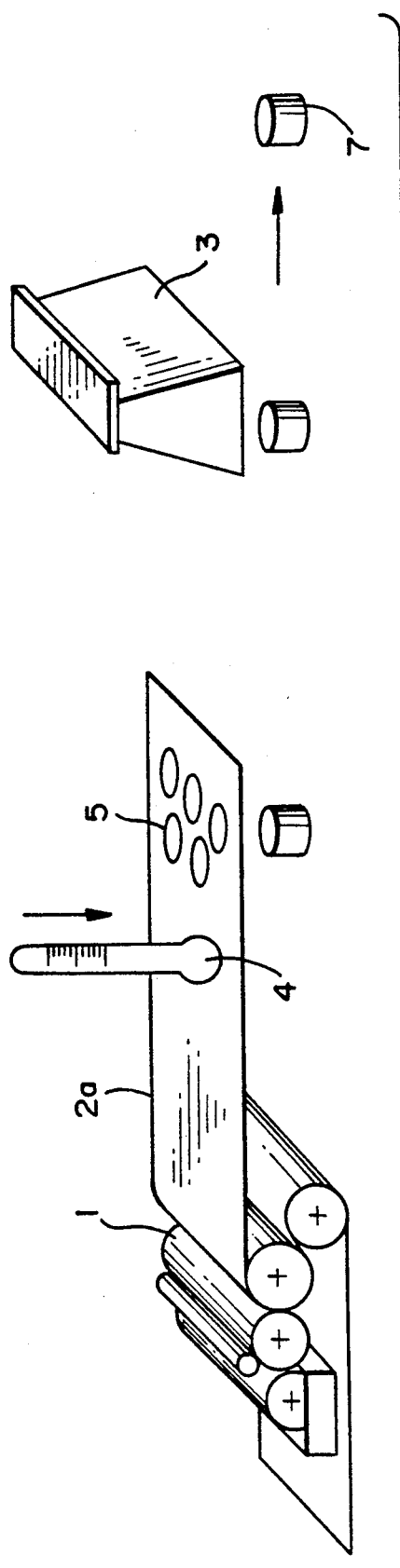

SOLVENT-FREE, LOW-MONOMER OR MONOMER-FREE POLYMERIZABLE HOT MELT COMPOSITION

BACKGROUND OF THE INVENTION

1. Field of Invention

This invention relates to a solvent-free, low monomer or monomer-free, polymerisable and radiation-hardenable hot melt composition for coating members of the group consisting of planar substrates, formed bodies of metal, plastic, cellulose material, inorganic material and a method for its production. The hot melt composition according to the invention is particularly suited to the corrosion-and-abrasion resistant finishing of planar packaging material substrates, preferably those used in the foodstuffs and pharmaceutical industries. Substrates finished with the melt composition according to the invention can be utilized in other areas, e.g. in the manufacture of automobile bodies, construction and in similar industrial applications.

2. Description of the Related Art

Corrosion-and-abrasion resistant finishing or treatment of planar substrates of metal, plastic and cellulose materials is a technical requirement that is defined by the materials to be treated. The purpose of the treatment is to protect objects against environmental damage and thus extend their lifetime. Protection against corrosion now plays an important role in the economy. In packaging materials, particularly those used in the foodstuff and pharmaceutical industries, additional high requirements are demanded of the anti-corrosion composition. The latter must be physically and chemically inert in the presence of a packaged product and must not release any toxic substance(s), or any substance(s) capable of altering taste or odor characteristic, into the surrounding area. In order to meet these requirements, state-of-the-art finishing systems must incorporate solvent-containing coating materials and lacquers. In this product group, the solvents serve as important auxiliary substances in that they enable the anti-corrosion substances consisting of polymers and resins to be utilized since the raw or starting materials for the latter are available primarily only as solids. The fluid state of the coating substance is further useful in that it "wets" the surface to be protected which is an important precondition for adhesion.

The solvents required for the above process may be aliphatic or aromatic solvents, such as e.g. esters, ketones, toluols, xylols, and the like substances. After the coating is applied and allowed to set, the solvents must be removed from or driven out of the protective coating material. Years ago, these solvents were simply driven off and permitted to escape into the atmosphere. However, legislation in the past few years has restricted such emissions. As a consequence, recycling processes have been proposed to attempt to recover the solvents. Despite the relatively high yield afforded by such recovery plants and the impressive practical rate of recovery (up to 95%), such processes are highly capital intensive in terms of investment and operation. Additionally, they also entail the disadvantage that the solvent-containing emissions, in order to conform to statutory air purity requirements, must be treated by after-burning. A further problem related to solvent recycling is that many of these solvents consist of mixtures of two or more solvents and therefore cannot be readily used with other coating materials or lacquers. Also, the recovered solvents and their mixtures are not capable of unlimited application, which is to say that after some recycling processes, such solvents must be eliminated, e.g. burnt off. In summary, these treatment processes are technically and economically quite burdensome and practically in no case are they 100% effective.

A partial improvement in the coating or treatment process has been achieved by using anti-corrosion agents having an aqueous dispersion base with a high solids content. With regard to the aqueous anti-corrosion agents, however, it has been demonstrated in many industrial sectors that the use of organic solvents cannot be completely dispensed with. Thus, the problem of solvent recovery originated. This affects primarily electrical coating by dipping where dispersion lacquers with solvent contents of up to 20% relative to the finished product are employed.

Recently, however, solvent-free coating materials and lacquers have also become known. These substances employ the so-called "one-pot" and "multi-pot" systems. In the one-pot system, ready for application, the material becomes reactivated and cross-linked in the presence of air moisture, while in the case of a two or more pot system, the product can be used only after homogeneous mixing. Due to the fact that these anti-corrosion materials ready for application possess a so-called "pottime" in which they can be applied, such materials have, for industrial application purposes, a series of disadvantages which cannot always be compensated for by the use of mixing and dispensing apparatus. Since they must furthermore be present as solvent-free, anti-corrosion materials in a fluid aggregate state, their individual reactive components consist of relatively low molecular compounds. These low molecular weight compounds, known also as reactive diluents, are in many ways not only physiologically harmful but possess distinct and characteristic negative taste and smell characteristics. The degree of cross-linking achievable, being only in the vicinity of <90% ensures amongst other matters that these products cannot be used to finish packaging materials for foodstuffs or pharmaceuticals. Technically speaking, however, too low a degree of cross-linking may hamper resistance against environmental influences. In general, the reactive diluents have the disadvantage that, when residues, even in parts per million amounts, are not cross-linked, they negatively influence adhesion to the boundary surface, since they are able to disperse much like solvents.

In order to accelerate the curing or the cross-linking process, polymerisable coating materials and lacquers have become known, which can be hardened by ionizing radiation, notably electron and UV radiation.

In order for coating materials and lacquers to harden in the presence of UV-radiation, so-called photoinitiators and even synergists must be added. These photosensitive additives, however, after curing remain in the anticorrosion layer and, during stacking operations or if in contact with packed product, contaminate the latter and as they are considered to be harmful to health, cannot be used for food or pharmaceutical packaging. The curing procedure involving ionizing radiation, however, does not require the addition of photosensitive substances or synergists. The state-of-the-art radiation-hardenable coating materials and lacquers present another considerable disadvantage in that they must, for processing purposes, have a relatively high acrylic group monomer content, the latter serving as application - facilitating reactive diluents. While some acrylic monomers are potentially harmful, others are known to be toxic. The existence of taste-and-smell-influencing substances that either escape into the atmosphere or come into contact with the packaged product, particularly foodstuffs and pharmaceuticals, remains one of the greatest disadvantages; it can be caused by the presence of very small amounts of monomer residue, even in the very low parts-per-million range.

Such anti-corrosion materials provide no certainty to technologists seeking in the future to finish objects under environmentally compatible and hygienic conditions, since the present state of the art provides no solutions that can meet these requirements. High standards have already been set regarding food and pharmaceuticals packaging, examples of which can be found in directives issued by the Federal Health Department (Germany) in its publication "Kunststoffe im Lebensmittelverkehr" ("Plastics in the Food Handling Industry"), and in directives published by the Food and Drug Administration and in various other national environmental codes. A further problem is caused by the additives required to produce conventional anti-corrosion materials. This has been described in Gachter/Muller "Kunststoff-Additive" 2. Ausgabe, Hanser-Verlag, Munchen, 1983, im Kapitel 18 "Gewerbe-und lebensmittelhygienische Aspekte von KunstoffAdditiven" ("Plastic Additives" 2nd Edition, Hanser-Verlag, Munchen, 1983, volume 18 of "Hygienic Aspects of Plastic Additives in Industrial and Foodstuffs Sectors"). This subject has been more fully explored in the paper by Piringer et al. on "Der Einfluss von Restlosemitteln und monomeren Acrylaten aus Verpackungen auf die sensorischen Eigenschaften von lebensmitteln" ("The Effect of Residual Solvents and Monomer Acrylates in Packaging Materials on the Sensory Properties of Foodstuffs"), in Verpackungsrundschau, Issue 8/1986, pp 53-58, since the premise had already been established that the residual solvents and the acrylic monomers have a particular sensory influence on the packaged food products. This paper demonstrates that, when inert solvents, acrylates or methacrylates are employed, the indicated relative threshold values of the latter for smell and taste remain problematic when such low-molecular compounds are used. Thus, the relative threshold value, for example in the case of n-butylacrylate is 0.002 and in the case of 2-ethyl-hexylmeth-acrylate is 0.02 mg/kg.

It can furthermore be said that, aside from differences in approach, the evaluation of the statutory measures and regulations concerning the environment, and industrial and personal hygiene, are substantially identical in the European Common Market, the American Market and in Japan. Comprehensive and comparative explorations of this area have been published by Keener, R. L., Plamondon, J. E. and West, A. S. in "Recent Developments in the Regulation of Industrial Chemicals in the United States and Europe", presentation by RADCURE EUROPE '85, Basel/Switzerland, Sponsor: AFP/SME, Dearborn, Michigan 48121, USA and in the book by Ronald Brickman et al. "Controlling Chemicals: The Politics of Regulation in Europe and the United States" Cornell University Press, Ithaca, NY, 1985.

Conventional lacquers and varnishes with different polymer bases which are dissolved in solvents have been amply described in the literature, as, for example in H. Kittel "Lehrbuch der Lacke und Beschichtungen" Bd. 4, 5 und 7, (Introduction to Lacquers and Coatings Vols. 4, 5 and 7 ) Verlag W. A. Colomb Verlagsgesellschaft mbH, Berlin und Oberschwandorf. Reference may be made to this publication for that purpose, and accordingly, it will not be necessary to consider this prior art in particular.

Similarly, corrosion-and-abrasion-resistant finishing of planar substrates and/or formed bodies (especially those containing metal and cellulose materials) which comprise coating agents without inert solvents, is well known and understood in industrial practice. In this connection, coating substances were employed, whereby either the backbone polymers were dissolved in reactive diluents or the base products were sufficiently fluid to be applied. Although these reactive diluents and/or other fluid co-reactants are integrated in the polymer matrix either by hardening or by cross-linking, residues remain, the amount of which depends upon the degree of cross-linking attained. These nonintegrated residues can neither be removed by additional costly cleansing processes, nor can they be reduced to amounts permissible under existing regulations. Because such compositions are also potentially harmful to the human body, such anti-corrosion materials have only a limited applicability, the implication of which being that such materials must be entirely excluded from use in the pharmaceutical and foodstuffs industries.

This is due solely to the fact that the sensory qualities (taste and smell) of such packaged products are easily affected. Although qualitative improvements may be made to non-thermosensitive substrates by baking and/or subsequent curing, such measures are seldom capable of ensuring compliance with required minimum standards. To this must be added the cost of such after-treatment, which is in turn reflected in the cost of the final product. Efforts have been made, therefore, to discover improved and economically sounder alternatives to radiation hardening, which would at the same time improve the product marketability. Due to the costs of attempts to meet minimum cross-linking levels—as has already been discussed, the radiation-hardenable coatings compositions have not produced the desired breakthroughs. Thus, in European patent application 0 157 396 thus are described radiation-hardenable compositions for sheet steels, which remain moldable after curing. Due to the fact, however, that these materials are processed at room temperature, they possess a relatively high proportion of reactive diluents, i.e. low-molecular acrylic monomers. Apart from featuring a relatively high residual monomer content, these radiation-hardened coating materials have only a limited workability or moldability. Experts are aware that, as the proportion of short-chain, low-molecular monomers in a coating matrix increases, so does toughness and brittleness. During processing, a great number of hairline cracks can appear in the anti-corrosion film, which significantly reduces product effectiveness.

In European Patent Application 0 184 349, radiation-hardenable, thermoplastic coating materials for wood and other substrates are described, which consist of copolymerisable ethylenically unsaturated polyesters and thermoplastic polymers. In order to be able to process these as coating materials, monomers, i.e., reactive diluents and/or inert organic solvents, are required. In this regard, coating materials have been proposed which, while offering good end product qualities, do not overcome the problems of inert solvent evaporation nor solvent and monomer residues.

For the purpose of anti-corrosion finishing, so-called "hot melt" compositions are known, whose structure is based upon inert resins, waxes, thermoplastics and/or elastomers. Use of the term "hot" is considered inappropriate (see Rompp's Chemie-Lexikon, 8. Aufl., Bd. 3/1983, s. 1763 (Rompp's Chemical Dictionary, 8th Edition., Volume 3/1983, page 1763), and accordingly, reference only to melt compositions will be used herein.

Melt adhesives, which are related to melt compositions, have achieved prominence in many sectors, but melt compositions have remained relatively unknown apart from their application in some areas such as anti-corrosion films. The latter are produced by using a dip of the melt composition, which may include cellulose esters, plasticizing mixtures and mineral oil additives, so that e.g. equipment or machine parts, are dipped in the hot composition and then left to cool. The film or coating thus developed may then be removed without leaving any residue.

Whether the melt compositions are employed for coating or for adhesive purposes, the thermoplastic raw materials, which include resins and plasticizers, are thermosensitive and hence subject to thermal oxidation, particularly in the presence of atmospheric oxygen. In this case, not only are the properties of the product altered, but physiologically harmful crack-products are also produced. The thermal problems connected herewith are described by the internationally used term "Heat History". Whereas with melt adhesives stabilizers and antioxidants can be used, the latter can be used with melt compositions only after they have been accepted for use in the technical sense. Such thermo-oxidative decomposition can be minimized by masking with inert gases such as nitrogen ($N_2$): A further disadvantage of using thermoplastic melt coating materials is that of their relatively low plasticization points, which should lie below +150° C., particularly below +120° C. A further disadvantage in this regard is that the backbone polymers in their end state are already macromolecules and therefore require very high process temperatures, from +180° C. to +270° C., in order to achieve sufficient wetting and thus adhesion to the various substrate surfaces. While materials exist that remain molten at lower temperatures, such materials possess no thermal stability and little chemical resistance. Such melt coating materials, which are, for example, described in DE-OS 24 25 395, have a formula based on ethylene-vinylacetate copolymers. Other melt compositions are described in the monograph by R. Jordan "Schmelzklebstoffe", Bd. 4a/1985 und Bd. 4b/1986, ("Melt adhesives"), Vol. 4a/1985 and Vol. 4b/1986, HINTERWALDNER VERLAG, Munchen. Included in the discussion are polyester melt compositions whose structures, based on linear copolyesters of terephthalic and/or isophthalic acid, can range from amorphous to crystalline. (DE-OS 24 14 287).

In order to better control the critical parameters which influence the "Heat History" and at the same time to improve the end properties such as thermal stability, reactive melt compositions have been proposed. Such melt compositions were mainly adhesive and sealing materials, which although processed analogously to melt coating material from a molten mass at temperatures below <150° C., especially <100° C. and therefore workable at an early stage, underwent crosslinking only in the presence of atmospheric humidity. Such materials are ideally moisture-hardened polyurethane systems. Depending on the layer thickness and the surrounding humidity, the curing process requires from 1 to 96 hours for completion. Such a curing process is, from the industrial standpoint, an immutable necessity even though un-integrated curing components are able to migrate. To date, other reactive melt compositions have neither been treated in the literature nor known in industry, wherefore the reasons cannot be solely those related to the so-called "Heat History", but are to be found in the unavailability suitable raw materials. Additional preventive measures alone are not sufficient to ensure compliance with increasingly demanding standards for environmental protection, food processing hygiene, workplace hygiene and sensory effects on packaging materials, since such measures entail both higher investments in plant, measuring equipment, etc. as well as expensive control systems.

For improved environmental protection and better workplace and food handling hygiene, it would be advantageous to address existing and potential product deficiencies by eliminating as far as possible their causes and thus decrease costs. Despite the numerous attempts already made, it has not been possible to manufacture melt compositions that possess even a fraction of the properties attributed to materials containing organic solutions. Since, however, corrosion-resistant finishes have, for economic reasons, already become a matter of public concern and necessity, the present invention is aimed at identifying innovative processes for the future which will eliminate and/or reduce the above-discussed and other deficiencies, while rectifying and/or reducing sensory problems and those related to food packaging and workplace hygiene.

German patent application P 36 41 436.0-43 (published June 9, 1988) discloses a solvent-free polymerizable and radiation-curable hot-melt compositions free of, or low in monomers, suitable for coating substrates and/or shaped or molded bodies consisting of metals, plastics, cellulose materials and/or inorganic materials, and a process for its preparation which addresses many of the above concerns and/or problems of the prior art. This hot-melt composition is especially suited to corrosion- and abrasion-proof wrapping substrates for use with foodstuffs and pharmaceuticals. However, substrates provided with such hot-melt compositions are also applicable elsewhere, for instance, with automobile bodies, in construction and the like as discussed above.

The hydroxyl-group containing polymers A and B of the hot melt compositions described in published German patent application P 36 41 436.0-43 are functionalized by means of monomeric acrylic, methacrylic acids and/or their derivatives. Similar considerations apply to the disclosed component C, of which the ethylene-unsaturated groups, preferably the acryl and/or the methacryl groups are derived from monomeric acrylic and/or methacrylic acids. Even though such functionalization by acrylization with monomeric acryl- and/or methacryl-compounds has been found practical in industry, a number of critical properties have presented problems. Among these are the significant shrinkages encountered upon curing or crosslinking, the brittleness of the networks which result and the general irritation to and sensitivity of the skin upon contact with same. While these drawbacks could be somewhat reduced by means of the second generation of polyfunctional acrylates and methacrylates made of polyols with higher molecular weights, in many cases inadequate resistance to ultraviolet light, various chemicals and acid exists.

OBJECTS AND SUMMARY OF THE PRESENT INVENTION

The object of the present invention is to provide a solvent-free, polymerizable hot-melt composition free of, or low in monomers, to corrosion- and abrasion-proof and/or to form a protective film with barrier properties on substrates and molded bodies made of metal, plastic, cellulose-materials and/or inorganic materials, in particular such as used for wrapping purposes, said hot-melt being free of the above-discussed disadvantages, said hot-melt composition consisting of (A) at least one polymerizable, hydroxyl-containing polymer(s) with an average molecular weight $\overline{M}_w$ between 1,000 and 500,000 and with a glass transition temperature $T_g \geq +20°$ C., and/or (B) at least one polymerizable, linear straight chain and/or branched polyester and/or copolymer thereof with an average molecular weight $\overline{M}_w$ between 800 and 50,000 and a glass transition temperature $T_g \geq -50°$ C., and/or (C) a polymerizable ethylenically unsaturated oligomer carrying a group selected from the group consisting of acrylic, methacrylic, ether, ester, urethane, amide, imide, epoxide, siloxane, phenol, novolak and/or mercapto compounds with an average molecular weight $\overline{M}_w$ of 400 to 10,000, and (D) optionally, further known additives, and further wherein components (A), (B) and/or (C) are functionalized with at least one dimeric and/or oligomeric acrylic acid of the general formula $$CH_2=\overset{R}{\underset{|}{C}}-\overset{O}{\underset{\|}{C}}-O+CH_2-\overset{R}{\underset{|}{CH}}-\overset{O}{\underset{\|}{C}}-O\underset{m}{\rightarrow}H$$

where R=H, —CN, halogen and/or an alkyl group with 1 to 4 C atoms, and m is a number between 1 and 5.

DETAILED DESCRIPTION OF THE INVENTION

The polymerisable polymers of (A) above containing hydroxl-groups according to one aspect of the invention are ethylenically unsaturated, thermoplastic polymers with an average molecular weight $\overline{M}_w$ of between about 1,000 and about 500,000, preferably between about 10,000 and about 300,000, more preferably between about 20,000 and about 200,000. The glass transition temperatures ($T_g$) of these backbone polymers is about $\geq +20°$, preferably $\geq +60°$ C., more preferably $\geq +90°$ C. The plasticization and melting points lie in the vicinity of $\geq +70°$ C., preferably $\geq +100°$ C. The polymerisable, ethylenically, unsaturated groups are present in a proportion of about $\geq 0.1$ weight percent, preferably $\geq 0.5$ weight percent. The ethylenically unsaturated group is an organic residue of the general formula 1:

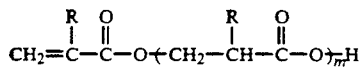
(1)

wherein $R_1$=H, CN or an alkyl radical with 1-4 carbon atoms

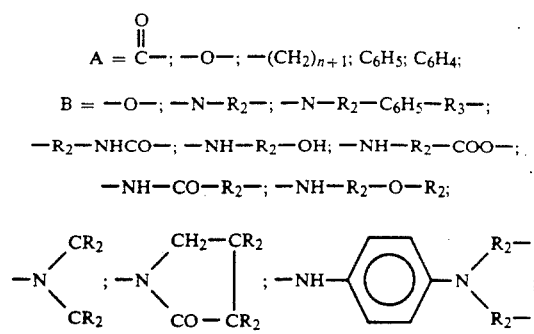

wherein $R_2$=terminal H, straight chain and branched acrylic groups, aralkyl groups, cyclic alkyl groups and acrylics containing 1 to 50 carbon atoms, preferably 1-20, $R_3$=terminal H, an alkyl group with 1 to 50 carbon atoms,

n=is an integer 0 to 50, preferably from 0-10.

Particularly suitable as the hydroxyl group containing polymer (A) is a derivative of cellulose, in particular a cellulose ester and/or cellulose ether with a reactive acrylic and/or methacrylic group content of at least 0.1 weight percent and an average molecular weight ($\overline{M}_w$) of between about 10,000 and about 250,000 and/or a phenol or novolak derivative with a ractive acrylic and/or methacrylic group content of $\geq 0.1$ weight percent, and an average molecular weight ($\overline{M}_w$) of between about 1,000 and about 50,000 and a glass transition temperature ($T_g$) of $\geq 20°$ C.

The thermoplastic backbone polymers for the melt compositions according to the invention, may be polymers and copolymers of starch and cellulose, which include cellulose esters, cellulose ethers, polyvinyl alcohols and their derivatized products which are attached to the hydroxyl groups, partially saponified polyvinylacetates and their copolymers, hydroxyacrylic polymers and copolymers, polyesters and copolyesters, with a minimum ethylenically unsaturated group content of $\geq 0.1$, preferably $\geq 0.2$, more preferably $\geq 0.5$ weight percent.

The thermoplastic, polymerizable cellulose esters and ethers according to the invention are derivatized products of commercially available cellulose esters and ethers with a compound carried by one of the above ethylenically unsaturated groups. The commercially available cellulose esters are marketed under the trade marks "CELLIT ®", "CELLIDOR ®" and should be formate, acetate, propionate, butyrate, capronate, stearate or mixed esters consisting of at least two of the related organic fatty acids. The cellulose ethers, on the other hand, can be alkyl, aralkyl and acrylic, hydroxyalkyl, carboxyalkyl- ethers or similar compounds. Moreover, mixed ethers and compound esters are also suitable, if they are able to provide certain characteristics to the melt composition according to the invention. It is important that cellulose esters and ethers be interchangeable with one of the previously described acrylic compounds and that they feature a post-reaction melting point of $\leq +300°$ C., preferably $\leq +250°$ C., especially $\leq +200°$ C.

The production of such polymerizable, thermoplastic cellulose esters and ethers has, for example, been disclosed in European Patent Application 0 146 277 and in Houben-Weyl "Macromolekulare Stoffe", Teil 2, "Umwandlung von Cellulose und Stärke", 1963, S. 863-915 ("Macromolecular Substances", Part 2 "Transformation of Cellulose and Starch", 1963, pp 863-915) in which attempts to graft other monomers and polymers to the cellulose molecule in order to create new types of plastic are described (p 894). This can be achieved, for example, by introducing polymerisable double bonds into the cellulose molecule, e.g., by etherification with allyl chloride or by forming radicals inside the cellulose molecule, e.g., through ozonization or irradiation of the cellulose. Cellulose polymers according to the invention include starch esters of organic acids, alkyl ethers and aralkyl ethers of starch. The latter can also have additional functional groups, a typical example being starch allyl ether, which can be polymerised with other allyl and vinyl compounds to produce cross-linking. Solutions of starch allyl ethers, which are known as feedstocks for lacquer production, are processed into inert organic solvents.

The use of these polymerisable, thermoplastic derivatized products of cellulose and starch also has an economic impact in view of the fact that world resources of cellulose and starch are not as limited as oil resources, from which the coreactants required to alter the derivatives of cellulose and starch are produced. Cellulose and starch, being natural substances, are therefore less environmentally noxious. Other suitable polymerisable, thermoplastic backbone polymers containing hydroxyl groups are polyvinyl alcohols and their derivatized products obtained by etherification, acetalization, ketalization and esterification, as well as a polymerisable group based on formula 1. Backbone polyesters can even be produced by transesterifying polyvinylesters, which may possibly already carry polymerisable, ethylenically unsaturated groups if for this purpose unsaturated carbon acids such as acrylic acid, maleic acid or their anhydrides are employed. Such compounds are described in DE-AS 10 65 621.

Important in this respect, besides the acetals and butyrals are the alkyl vinyl ethers such as ethyl, n-butyl, isobutyl and octyl vinyl ethers which can also be polymerized by energy-rich radiation. Such reactions have already been described by J. G. Fee et al. in the Journal of Polymer Science 33, pg. 95 (1958).

Also known in the art are the light-cross-linking derivatized products of polyvinyl alcohol or other copolymerizates containing hydroxyl groups, maleic acid anhydrides, p-amino cinnamic acid esters and similar compounds as described, for example, in U.S. Pat. No. 2,811,509.

Other particularly suitable polymerisable, thermoplastic backbone polymers containing hydroxyl groups are compounds from the phenol, novolak and resorcinol groups carrying a polymerisable group according to formula I. Such compounds can be made, together with bi-phenols and novolak epoxides (see e.g. H. G. Elias, Makromolecule (Macromolecules) Basel, Heidelberg, 1972, pp. 707-709) by means of derivatization in the presence of acrylic or methacrylic acid. Even derivatizations with a) isocyanatoalkylacrylate or methacrylate; b) addition compounds of di-, tri- or polyisocyanates or isocyanate prepolymers with low molecular weights with hydroxylalkylacrylates or hydroxylalkylmethacrylates; c) glycidylacrylate or glycidylmethacrylate produce backbone polymers that carry a polymerisable group according to formula 1. These have a proportion of polymerisable groups of $\geq 0.1$ weight percent, an average molecular weight ($\overline{M}_w$) between about 1,000 and about 50,000, preferably about 1,000 and about 10,000, particularly about 1,000 to about 5,000 and have a glass transition temperature ($T_g$) of $\geq +20°$ C.

Their chemical structures correspond, for example, to the general formulae 2 to 4. Moreover, such novolaks are suitable, having been produced by the condensation of phenols with acetaldehydes, acetylenes, vinyl ethers and/or furfurol and carry at least one ethylenically unsaturated group based on formula 1.

All of the polymerisable straight chain polymers according to the invention and described herein must possess thermoplastic properties permitting their combination with the melt compositions according to the invention. The melting points in this connection are $\leq +300°$ C., preferably $\leq +250°$ C., in particular $\leq +200°$ C., and possible monomer residues resulting from the derivatization with an ethylenically unsaturated residue from the previous formula 1 are present in a proportion below 0.01 weight percent, preferably below 0.001 weight percent and are themselves in particular free of low-molecular ethylenically unsaturated compounds with a mole weight $\leq 500$, preferably $\leq 800$.

These backbone polymers in particular determine the toughness, the chemical and thermal stability and water resistance of the hardened or cross-linked melt compositions proposed.

Components (B) to be used according to the present invention are produced from saturated, linear or branched thermoplastic polyesters and their copolymers. These may be derivatized products of bi-and-multifunctional alcohols such as ethylene glycol, neopentyl glycol, hexandiol-1,6, trimethylolpropane, with aromatic acids such as phthalic-, isophthalic and terephthalic acids and possibly a proportion of condensed-in aliphatic dicarbonic acids. Such polyesters or their copolymers become reactive, polymerisable groups according to formula 1, and are either grafted to, or condensed into the molecule as it is being produced. The proportion of polymerisable groups contained is $\geq 0.1$, preferably $\geq 1.0$, in particular $\geq 1.5$ weight percent. The average molecular weights lie between about 1,000 and about 50,000, preferably about 1,000 and about 20,000, more preferably about 1,000 and about 10,000. The glass transition temperature is $\geq -50°$ C., preferably $\geq -30°$ C. The polymerisable polyesters and their copolymers may also feature a hydroxyl group number of between about 0.1 and about 10 weight percent. These furthermore have an acid number of between about 0 and about 100, preferably about 0.1 to about 50, particularly about 2 to about 20 mg KOH/polyester or copolyester. The COOH groups present in the molecule assume the role of adhesion promoter, whereby they improve the adhesion of the melt coating to metal substrates. Proportions of residual monomers present in the B components are about $\leq 0.1$, preferably $\leq 0.05$, in particular about $\leq 0.01$ weight percent. The melting points are $\leq +250°$ C., preferably $\leq +200°$ C., in particular $\leq +150°$ C. The production of the base polyesters and copolyesters has been amply dealt with in the literature, as has their modification with a residue of the present formula. In this connection see for example HOUBENWEYL, "Makromoleculare Stoffe", Teil 2,: "Polycarbonsaureester", s. 1–44, 1963 ("Macromolecular Materials", Part 2: "Polycarbonic acid esters", p. 1–44, 1963).

The polymerisable polyesters and their copolymers may be amorphous, semicrystalline or crystalline.

The preferred base polyesters are according to the invention non-cross-linked and entirely linear, i.e., produced from unbranched main chains with branching determined by the trifunctional structuring of the main chain being comparatively slight, irrespective of the manner in which the alkyl side chains are bonded to the main chain by the ester and/or ether bonds. These polyesters are either entirely or primarily comb-like in structure, whereby the alkyl side chains extend outwardly from the essentially linear and unbranched main polyester chain in a regular, static arrangement. In this connection, the following may be employed as the starting material: aliphatic di-, tri- and higher polycarbonic acids, aromatic di-, tri-, and polycarbonic acids, dihydroxymonocarbonic acids and hydroxydicarbonic acids as mono and dialkylesters of the said di- and higher functional carbonic acids, mono- or dicarbonic acid esters of diols and higher polyols, or dimonocarbonic acid esters and mono- and dialkyl esters of mono- and dialkyl esters of diols and higher polyols, as well as the monocarbonic acids and monoalkanols as such.

In the preferred polyesters, the mol ratio of the ester segments of the main chain to the side chains should be about 1 to from about 0.02 to about 2.0, in particular about 1.0 to from about 0.05 to 1.0. The glass transition temperatures $(T_g)$ of these polyesters are in the region of $\leq +50°$ C., preferably $\leq +20°$ C., in particular $\leq +10°$ C. Viscosity values lie between 5 and 10,000 Pa.s at 120° C. In these new polyesters, the side chains exercise a singular effect upon viscosity, or rather molten viscosity since when the temperature increases slightly, the viscosity drops sharply.

The unexpected sharp decline in viscosity given an increase in temperature is according to the present invention as has been unexpectedly discovered, an essential prerequisite for the production of monomers and the additive-free melt compositions according to the present invention proposed for use in the food and pharmaceutical industries.

Functionalization of the polyesters with ethylenically unsaturated groups according to formula 1 may take place, for example, by derivatizing from about 10 to about 90% of the hydroxyl and/or from about 10 to about 100% of the carboxyl groups present in the polyester. Especially suitable as polymer (B) is a base polyester carrying a hydroxyl group, which consists of: a) hydroxyl polyesters with branched chains consisting of polyester units, with branching at third and higher polyester-forming functions and/or b) hydroxyl polyesters with alkyl side chains possessing from about 2 to about 50 carbon atoms, preferably from about 4 to about 36 carbon atoms in the alkyl group, bonded by ester or ether groups of third or higher polyester-forming functions, containing $\geq 0.1$ weight percent of reactive acrylic and/or methacrylic groups, with an average molecular weight $(\overline{M}_w)$ of about 1,000 to about 20,000, preferably from about 1,000 to 10,000 and a glass transition temperature $(T_g) \leq +50°$ C., preferably $\leq +20°$ C.

Components (A) and (B) for the melt compositions according to the invention may be employed on their own or in combination with each other. Should components (A) and (B) be used in a composition, their proportions should be from about 99:1 to from about 1:99, preferably about 50:50, in particular from about 3 to 35:97 to about 65 weight percent. Since components a) and b) can cross-link with each other, the mole equivalents of reactable, polymerisable groups according to formula 1 play a partial role. In a number of applications, particularly the corrosion-and-abrasion-resistant finishing of steel or tin sheets, optimum metal adhesion is required as well as a high degree of toughness.

This requirement applies particularly to polymerisable melt compositions, which serve without the addition of additives, for the corrosion resistant finishing of substrates for the foodstuffs and pharmaceutical industries, and which furthermore can be applied to untreated surfaces. Similar problems continue to affect technical application, for here, due to costs such as encountered in vehicle manufacture, surface pretreatment and degreasing cannot be performed. In order to be able now to meet these and other requirements, it has been demonstrated by the invention that, advantageously, both backbone polymers (A) and (B) must be represented in a melt composition if the backbone polymer (B) cannot alone meet the above-mentioned specifications. While flexibility and impact resistance can be influenced and controlled with the polymerisable straight chain polymers containing hydroxyl groups, such as the cellulose esters and ethers, with an average molecular weight $(\overline{M}_w)$ of $\geq 20,000$, preferably $\geq 30,000$, the polymerisable, linear unbranched and/or branched polyesters, especially those with an acid number of $\geq 5$ mg KOH/g, are responsible for metal adhesion and impact resistance. Due to the fact that this problem can preferably be solved only with polyesters and their copolymers with relatively low molecular structures, since they remain fairly fluid when molten, preferably those with molecular weights $(\overline{M}_w)$ of from about 1,000 to about 10,000, in particular from about 2,000 to about 6,000, can be employed. These low melt viscosity values of the polyester and their copolymers are required for more rapid wetting with greater coverage, for, together with the adhesion promoters already incorporated in the molecule, e.g. carboxyl groups, they ar responsible for producing optimal adhesion. This fact holds true especially in the case of tin sheet.

In some cases, the various polymerisable polyesters and their copolymers alone or combined in ratios of between from about 99:1 and from about 1:99 can be used as polymerisable melt compositions, as has been unexpectedly discovered.

This relates preferably to base polyesters and copolymers carrying hydroxyl groups, the former having average molecular weights from about 1,000 to about 20,000, in particular from about 1,000 to about 10,000 from the group consisting of a) hydroxyl polyesters with branched chains having branching at third and higher polyester-forming functions and consisting of polyester units and/or
b) hydroxyl polyesters with alkyl side chains containing from about 2 to about 50 carbon atoms in the alkyl groups bonded through ester groups or ether groups of third or higher polyester forming functions.

Component (C) comprises polymerisable oligomers carrying ethylenically unsaturated groups of acrylic, methacrylic, ester, ether, urethane, amide, imide, epoxide, siloxane, phenol, novolak and/or mercapto compounds, carrying at least one reactive group based on formula 1. The preferred reactive group capable of polymerisation is an unsaturated vinyl group, in particular an acrylic group. The oligomers have average molecular weights ($\overline{M}_w$) between about 400 and about 10,000, preferably between about 800 and about 6,000. At room temperature they range from fluid to solid. Some of these oligomers exhibit "semi-crystalline" characteristics, which indicate exceptional purity and tight molecular weight distribution.

The functions and purposes of component (C) in one of the melt compositions according to the invention is:
- as a cross-linking agent;
- as an adhesion promoter;
- as a modifier for improving rheological properties, for instance melting- or, rather, the processing viscosity;
- as a modifier for improving the end characteristics of the cured melt composition;
- to promote variations in toughness, or rather flexibility;
- to improve resistance against environmental influences, chemicals, acids, salts, etc.; and
- to improve stability in heat and cold.

Examples of component (C) include oligomers carrying ethylenically unsaturated groups such as may be selected from the group consisting of pure acrylate and/or methacrylate; acrylic acid esters and/or methacrylic acid esters; polyesteracrylate and/or methacrylate; polyetheracrylate and/or polyurethane-acrylate and/or methacrylate; methacrylate; epoxide acrylate and/or epoxide methacrylate; polyacrylated polyols and/or polymethacrylated polyols; acrylated and/or methacrylated polytetrahydrofurane; acrylated phenols and novolaks and their derivatives and/or methacrylated phenols and novolaks and their derivatives; acrylated polycarbonates and/or methacrylated polycarbonates; acrylated polyamides and/or methacrylated polyamides; acrylated polyimides and/or methacrylated polyimides; acrylated melamine resins and/or methacrylated melamine resins; acrylated polysiloxane and/or methacrylated polysiloxane; acrylated polysulfide; and/or methacrylated polysulfide.

In addition, within the spirit of the invention, fumaric acid and/or maleic acid based-polyesters as well as acrylated and/or methacrylated diolefins such as polybutadiene can be used. Suitable as well for modifying the hot melt composition according to the invention are fluorine hydrocarbon substituted, ethylenic unsaturated group-carrying oligomers such as fluorine hydrocarbon substituted polyetherurethane acrylate. Particularly suitable are acrylated and/or methacrylated polyesterurethanes as described for example in DE-OS 29 14 982. Such acrylic or methacrylic group-carrying polyesterurethanes have a very tight molecular weight distribution and because of their purity and the absence of monomers can partially crystallize. The higher molecular types with a molecular weight $\leq 1,200$ possess at room temperature a wax-like structure and plasticization, or rather melting point of $\leq +100°$ C. These components not only cause the melt viscosities to be lowered but they can lend greater flexibility to the melt compositions according to the invention.

Further particularly suitable oligomers are the acrylated and/or methacrylated phenols, novolaks and their derivatives of the general formula:

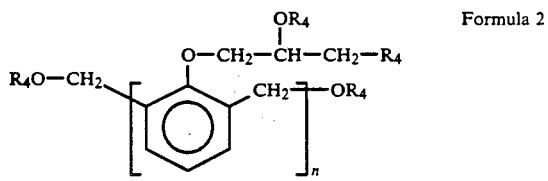

Formula 2 wherein $R_4$ = terminal H and/or a residue according to formula 1,
n = an integer between 2 and 20

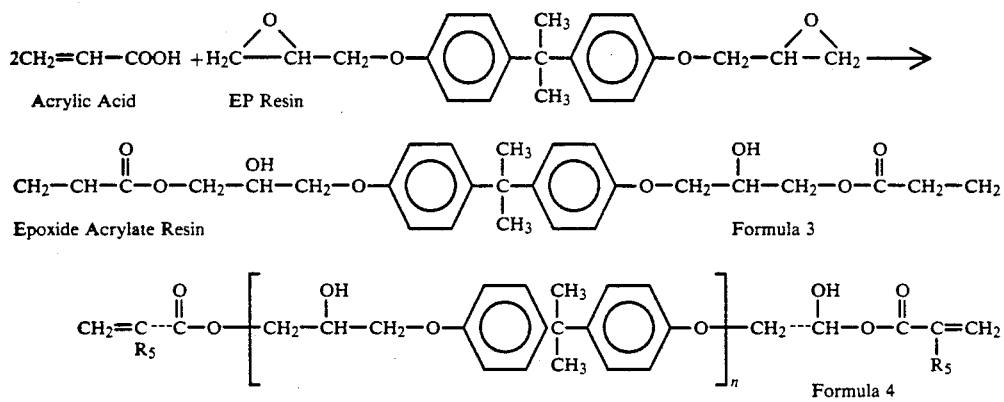

wherein $R_5$ has a terminal H and/or the equivalent of $R_1$ in formula 1, n = an integer from 1 to 2.

Such phenol group-containing compounds in accordance with the invention can regulate thermal, sterilization and chemical stability of the melt compositions of the present invention, which in the case of packed product in the food and pharmaceutical industries, are essential.

Addition of the (C) components depends on the given melting and process temperatures of the backbone polymers employed. Their addition enables the melt and processing viscosity of the melt compositions of the present invention to be reduced, in that the oligomer remains thermostable in this temperature region.

The oligomers have a residual monomer content of $\leq 0.5$, preferably $\leq 0.05$, particularly $\leq 0.01$ weight percent. The ratios of components A and/or B are between about 3:97, preferably about 50:50, in particular from about 20 to 30:80 to about 70 weight percent.

The first (D) components to be mentioned should be pigments, which color the melt composition. By the term "pigment" are understood common coloring agents, color producing compounds, fillers and extenders of all kinds, which in addition supply the melt compositions according to the invention with solids and render such compositions capable of holding an impression. At the same time, such pigments give the melt compositions a host of other specific properties.

Should these pigments be employed in melt compositions or anti-corrosion agents later to be used in the foodstuffs and pharmaceutical areas, such pigments must first meet statutory guidelines concerning foodstuffs. The properties and functions of such substances have already been documented in O. Luckert "Pigment und Fullstoffe", 2. Auflage, 1980, M. u. O. Luckert, Laatzen. (O. Luckert "Pigments and Fillers", 2nd edition, 1980, M and O. Luckert, Laatzen). The proportion of pigments and fillers present in the melt compositions according to the invention can range from between about 1 and about 80, preferably from about 10 to about 70, in particular from about 20 to about 60 weight percent, relative to the proportion of components (A) and/or (B).

For employment in the technical area, further additives such as stabilizers, antioxidants, leveling agents and surface active agents can be added to the melt compositions according to the invention.

The additives have been sufficiently dealt with in the literature; the reader has thus only to refer to Gachter/Muller "Kunstoff Additive", 2. Ausgabe, Hanser Verlag, Munchen, 1983 (Gachter/Muller, "Additives in Plastics", 2nd edition, Hanser Verlag, Munchen. 1983). The additive content in the composition ranges generally from between about 0.1 to about 5.0, preferably from about 0.1 to about 2.5 weight percent relative to the finished melt composition.

In the foodstuffs and pharmaceutical areas only, such leveling and surface acting agents can be used provided that they contain at least one polymerisable double carbon and/or triple bond in the molecule and thus are capable of being chemically bonded with the cured melt composition matrix. Examples of such surface acting agents and leveling agents are, e.g., oxyethylated 2,4,7,9,-tetramethyl-5-decin-4,7,-diol of the general formula

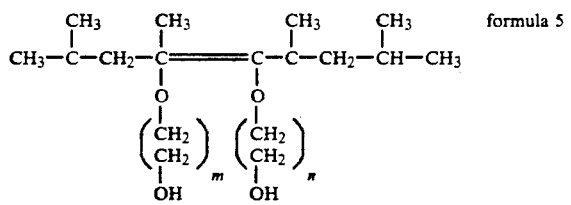

formula 5 m = an integer between 1 and 20,
n = an integer between 1 and 20.

Even the siliconacrylates employed according to the invention from the group of (C) components can assume the role of a leveling, surface active and/or anti-foaming agent.

The dimeric acrylic acid denoted by "beta-acryloxy-propionic-acid" has long been known. It is produced as a by-product when preparing monomeric acrylic acid ($CH_2$=CH—COOH). However, it and other oligomeric acrylic acids used in the present invention to functionalize components (A), (B) and/or (C) have received little attention in commercial chemistry.

Dimeric acrylic acid can be prepared with high purity in the laboratory by means of the "Michael" addition. For the sake of economy, and depending on the conditions of addition, various mixtures of dimeric and oligomeric acrylic acid are formed in commercial production. However, the "Michael" addition can be controlled in such a way that, for example, the proportion of dimeric acrylic acid in the thus-produced dimeric-/oligomeric mixture is at least 50% by weight.

The dimeric and oligomeric acrylic acids differ from monomeric acrylic or methacrylic acid as a result of the physical properties exhibited by each as shown in Table 1. Similar differences apply to mixtures of dimeric and oligomeric acrylic acids.

The dimeric and oligomeric mixtures of acrylic acids consist of dimeric, trimeric, tetrameric and/or pentameric acrylic acids of the general formula

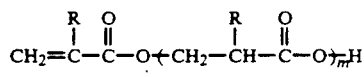

wherein R and m are as above is denoted by the index "m" which is between 1 and 5. A typical example of such an m-value of 1.4 is as follows

| m | 0 | 1 | 2 | 3 to 5 |
|---|---|---|---|--------|
| % | 5 | 55 | 20 | 20 |

Dimeric and/or oligomeric acrylic acids are especially well suited to functionalize the components (A), (B) and (C) of the hot melt of German application P 36 41 436.0-43 because, as has been unexpectedly and surprisingly discovered, they offer a series of advantages over the monomeric acrylic acids including higher reactivity in polymerization and radiation-curing, higher acidity, increased adhesion (bonding) when using backbone polymers functionalized thereby (components (A) and (B)) and/or the ester compounds (component (C)) prepared thereby as regards coating materials for metal substrates, more flexible end products with improved deformability, lower shrinkage in curing, improved resistance to weathering and chemicals, increased viscosity and reduced vapor pressure because of higher molecular weights, and strongly reduced toxicity and skin irritation.

These dimeric and oligomeric acrylic acids allow esterification with compounds bearing mono-, bi-, tri- and poly-functional hydroxyl groups, for instance alcohols and polyols. The mono- and multi-functional esters made from dimeric and/or oligomeric acrylic acids can be prepared by means of direct esterification using generally known procedures -- in the manner of the conventional esters from monomeric acrylic acids. They also must be stabilized by inhibitors. Table 2 summarizes the properties of the monomeric and oligomeric acrylic acids. Where dimeric acrylic acid or acryloxy-propionic-acid and their derivatives are discussed below, such compounds are prepared from a tri-, tetra- and/or penta-meric acrylic acid and its mixtures described by the above general formulas.

Exemplary dimeric and oligomeric acrylic acids include but are not limited to the following:

(1) Acids: Acryloxy-propionic-acid, methacryloxy-propionic-acid, cyanacryloxy-propionic-acid, acryloxy-propionyl-oxycarbonyl-propionic-acid, chloracryloxy-propionic-acid and the like.

(2) Acid derivatives: Acryloxy-propionic-acid methylester, acryloxy-propionic-acid ethylester, di-acryloxy-propionic-acid-1,3-or 1,4-butane diol ester, di-acryloxy-propionic-acid diethylene glycol ester, tri-acryloxy-propionic-acid trimethyl propane ester, di-acryloxy-propionic-acid neopentyl glycol ester, di-acryloxy-propionic-acid ethoxyneopentyl glycol ester, acryloxy-propionic-acid amide, and N-methylol-acryloxy-propionic-acid amide.

The functionalization of the components (A), (B) and/or (C) with one or more of such dimeric acrylic acids and/or their derivatives, where called for the combination with the conventional acrylic- or methacrylic acid compounds, is carried out using known procedures such as condensation, esterification, grafting and the like.

As described in published German patent application P 36 41 436.0-43 the content of functional acryloxy- and/or methacryloxy-groups in the components (A), (B) and (C) is at least 0.1% by weight. If on the other hand functionalization takes place in conjunction with monomeric acrylic- and/or methacrylic-acid and their derivatives, then such content may be reduced to 0.05% by weight provided that the minimum content of 0.1% by weight of functional groups is retained.

In the present invention, the components (A) and (B) functionalized with acryloxy- and/or methacryloxy-groups are especially significant a backbone polymers in the hot-melt compositions of the invention, because the above-described advantageous properties such as improved adhesion to metal substrates, lower radiation doses and increased flexibility and abrasion-resistance in the cured coating also may accordingly be transferred to the functionalized backbone polymers. The same considerations apply to the physiology and toxicity of the cured and uncured hot-melt compositions, a special contribution being obtained from the very low content of functional groups which are not cross-linked.

Because of the higher molecular weights, the mono-, bi- and multi-functional esters of acryloxy-propionic-acid may be used as oligomeric backbone polymers and/or as reactive diluents in the hot-melt compositions of the present invention, preferably when their molecular weights are $\geq 500$. The higher polarity and acidity desirably affects the bonding of metal substrates relative to esters of monomeric acrylic acid. If they are used as crosslinking agents, more flexibility or visco-plasticity will be incorporated into the cured matrix due to the lower crosslinkage density achieved. Again as regards the senses, such compositions are superior to the esters of monomeric acrylic- and methacrylic-acid since they are practically odorless. As shown by tests, their physiological and toxicological values are substantially improved and thereby they contribute positively to the ecology and workplace health.

Components (A), (B) and (C) functionalized with acryloxy-propionic-acid and its derivatives may be used as a function of their molecular weights either alone or in combination with one or several components as the raw materials of polymerizable and radiation-curable hot-melt adhesives. This is especially so when the molecular weights are $\geq 500$, and preferably $\geq 1,000$. Because the bi- and multi-functional esters of acryloxy-propionic-acid may meet these conditions, it is possible to thereby develop hot-melt substances which in particular also account for the "heat history"; that is, hot-melt substances of the present invention can be developed which have lower melting temperatures and viscosities and illustratively nevertheless shall assure optimal bonding at the critical tinned sheet metal surfaces. Thereby, the danger of forming cracked products will be reduced, and furthermore the relatively high reactivity entails essentially improved crosslinking at lower radiation dosage in radiation-curing, or shorter polymerization times for free radical crosslinking in the presence of heat.

Because of the higher degree of crosslinkage and the lower crosslinking density, the hot-melt substances allow coated material and substrate surfaces to meet both present-day and future legal requirements for wrapping materials used for foodstuffs and pharmaceuticals. However, the hot-melt substances of the invention also are applicable to other fields such as for automobile bodies, in air and space technology, where they offer substantive advantages and where they provide new technological advances which simultaneously are more ecological.

The new hot-melt substances of the invention are prepared according to the procedures of published German patent application P 36 41 436.0-43 as discussed below. Because high proportions of esters of acryloxy-propionic-acid must be used in the hot-melt substances, the processing temperatures may be significantly lowered. Clearly similar considerations apply to fitting substrates and molded bodies with the polymerizing hot-melt substances of the invention. Curing itself also takes place under a protective gas atmosphere.

A further objective of the invention is that of producing the hot melt compositions according to the invention, in particular those destined for use in the foodstuffs and pharmaceutical sectors and which therefore do not contain additives such as stabilizers or antioxidants.

Polymerisable unsaturated cellulose esters and ethers from the group of (A) components, which carry ethylene groups and contain hydroxyl groups are especially thermosensitive. This fact should explain why polymerisable cellulose polyesters in the European Patent Application 0 146 277 and in the European Patent Application 0 184 349 are caused to undergo reaction at $\leq +120°$ C. and $\leq +80°$ C. respectively and in an inert vehicle. Furthermore, the cellulose esters and ethers can feature a high proportion of adhesing atmospheric oxygen. Since as thermoplastics such esters and ethers are thermosensitive, thermic oxidation and hence the degradation of the cellulose molecule is accelerated in the presence of atmospheric oxygen, which leads to the rapid development of crack-products. Such crack-products not only discolor the melt compositions, turning them from brown to black, but can also produce physiologically harmful effects. Preparation of the raw material resulting in the hot melt compositions of the present invention should therefore not only take place inside an atmosphere of inert gas, but, unexpectedly, it has been discovered to be advantageous if the backbone polymers which carry hydroxyl groups which: - are pre-rinsed or prewashed with inert gas, and/or - are degassed in an aqueous suspension, if necessary under vacuum, in order to remove atmospheric oxygen. If degassing in an aqueous suspension has been performed, the first phase of the melt down process must include predrying at a temperature approximately 10° C. below the melting or plasticization point of the backbone polymer.

By contrast, the hydroxyl group-containing polyvinyl alcohol, phenol and novolak derivatives, as well as the polyesters and their copolymers are not nearly so thermosensitive and susceptible to thermooxidation. Nevertheless, similar care should be exercised during their preparation in order to obtain polymerisable melt compositions free from crack-products. However, washing with inert gas and/or vacuum degassing may be dispensed with in general since these substances are already degassed when supplied.

Prior to reaching the so-called main melting phase, the hydroxyl group-containing backbone polymers are prewarmed to their melting or plasticization point. Next, the temperature is raised +20° C. to +60° C. above the melting or plasticization point in order to bring the composition rapidly to a molten, homogeneous state. As soon as the melt becomes homogeneous and free of hard bits and pieces, component (B) and if required, component (C) is added. Components (B) and (C) should be brought to temperatures at least as high as the melting or plasticization point of the backbone polymers containing the hydroxyl groups. A lower temperature presents problems for a continuous process inasmuch as through cooling, the viscosity and hence the cohesive resistance in the developing melt composition would increase, which could lead to degradation. Even the (D) component is desirably pre-warmed before being introduced into the composition. If inorganic pigments and fillers are to be added, these should also be warmed to the process temperature so that they can be quickly and without difficulty integrated into the composition. Finally, a degassing procedure may be carried out in a vacuum at pressures up to $10^{-1}$ Torr. The finished melt composition may continue on an in-line basis to be processed further, or in an off-line process, the composition can be cooled down and if required, formulated into granules. In order to prevent thermal oxidation, such a process must take place in the presence of an inert gas. Nitrogen ($N_2$), Carbon dioxide ($CO_2$), and similar gases can be used as the inert gas.

Continuous Processing

For the continuous processing of feedstocks used to produce the melt composition according to the invention, an extruder comprising at least one worm is used. Components (A) and/or (B)-preferably pre-warmed-are poured into the extruder as the first raw materials. Component (B), and if required, component (C) is then melted or prewarmed and added to the already molten melt composition. Should the addition of the component (D) be required, it is also most preferably pre-warmed and integrated in the last processing portion of the extruder.

Processing temperatures and times are primarily determined by the plasticization and melting points of the raw materials used. The metered feed of the individual raw materials or mixtures/aggregates of the same can, in the case of solid materials, be carried out by using weight and gravity-activated metering devices while in the case of liquids, by means of metering pumps. The entire process should ideally be controlled by microprocessor. Mixing times, however, should be set at $\leq 10$, preferably $\leq 5$ minutes in order to exclude the possibility of heat loss. The procedure may, if required, be carried out under an atmosphere of inert gas.

Preparation of the raw materials for the additive and monomer-free melt compositions of the present invention for the food and pharmaceutical industries must definitely occur within an inert gas atmosphere in a continuously operating extruder so as to minimize thermal damage to the greatest possible extent. The so-called "Ko-Kneters" (Kokneaders) are particularly suitable for production with short mixing times.

The homogeneous, hot melt composition may, after vacuum degassing has been performed, either be a) pumped directly to a coating or application area, or b) cooled and granulated or poured into barrels.

Discontinuous Processing

Discontinuous processing of the raw materials used for producing the melt compositions according to the invention may a) take place in a melt kneader with two Z mixing arms employed for mixing purposes and a worm extrusion device and b) for low and medium viscosity products, may take place in a melt dissolver. Both mixing apparatuses can be heated and for the purpose of removing gasses used in processing, a vacuum system can be utilized.

In this process as well, the (A) and (B) components are placed in the melt kneader first. As soon as these components have been prepared, the remaining solids, if desired are pre-warmed, and then added. Finally, any liquid additives are worked-in and integrated homogeneously into the mass. Thereafter, the melt composition is degassed under a vacuum, and then further processed as outlined above in the continuous processing method.

The optional granulation in an off-line system, may be carried out, if required, by producing ropes or strings by cooling techniques and then by cutting the ropes/strings thus produced.

A further feature of the invention is the finishing of a substrate with the polymerisable hot melt compositions of the invention. The polymerisable melt compositions according to the invention are suitable for forming corrosion-and-abrasion resistant coatings and/or development of a coating film with barrier properties for e.g., the following planar substrates and formed bodies:

a) Metals such as: steel sheets of all types, tin plate, aluminum sheet and foil, copper sheets and foil, and similar materials; b) cellulose materials such as: paper, cardboard and paperboard of all kinds, wood chip and wood fiber board, plywood, wood boards and similar materials; c) plastics such as: films and sheets made of e.g., polyvinyl alcohol, polyethylene, polypropylene, polycarbonate, polyvinylhalogenide, polyester, polyamides and their copolymers fiber composites of thermo- and pressure-setting plastic; and d) inorganic materials such as: cement and gypsum sheets including sheets of fiber composites, glass and similar materials.

The above list of substrates is not complete and serves only to illustrate that with the polymerisable melt compositions of the invention, a large number of materials can be rendered corrosion-and-abrasion resistant and/or be finished with a protective film.

In many commercial and industrial sectors, the above-mentioned and other substrates may be required to undergo a final process that renders them resistant to corrosion and abrasion, and/or that coats them with a protective film. Such industries are the packaging material and the packaging industry, the motor vehicle, aviation and shipbuilding industries, the wood products industry and producers of exterior sheeting and siding for buildings.

The additive-free or low additive, or monomer-free or low monomer polymerisable hot melt compositions are particularly suited for use in the packaging material and packaging industries for the food and pharmaceutical products industries. Packaging materials supplied to such industries will, in the future, not only have to be produced under more stringent quality control regulations, but such packaging materials will also have to meet the higher requirements of the food products and pharmaceutical industries in terms of their physiological and sensory performance and characteristics. In order for this objective to be reached, new coating materials will be required to be produced and processed by a different technology. This objective can be realized in the packaging materials and packaging industry by the use of the solvent, additive and monomer polymerisable melt compositions according to the present invention. The application technology required for this purpose is thus a further feature of the invention.

To this end, differences in properties will have to be recognized between metal, plastic and cellulose-containing packaging substrates or materials. Particular attention must be paid to metallic packaging materials, since they are particularly susceptible to corrosion relative to the packaged product and also to the environment should the substrate surfaces or connecting surfaces not be adequately protected. A publication by H. Kolb, in "Herstellung and Prufung von Konservendosen", Fleischwirtschaft 63 (9), 1983, s. 1373–1382 (Production and Quality Control of Conserve Tins, Fleischwirtschaft 63 (9), 1983, S. 1373–1382), deals with the production and inspection of preserving tins and the critical parameters involved. Reference may be made to this article for further information on this point.

In the production of preserving or canning tins, aluminum, steel and tin sheet in thicknesses of 0.15 to 0.35 mm are generally used. Tin sheets are frequently provided several times with an anti-corrosion layer of pure tin. Nonetheless, the tin cans must also generally be coated with a corrosion-resistant lacquer. Although aluminum, as opposed to tin sheets, possess some positive characteristics, it is additionally necessary to coat the inside and outside of this material with lacquer in order to prevent "pit formation". This phenomenon occurs in the presence of packaged products having low pH values, and includes fish products and soft drinks.

With respect to the production of metal tins, a distinction should be made between: a) a three-part tin consisting of the body with a side seam, a bottom and a cover, and b) a seamless, two-part tin consisting of flattened and/or deep drawn bodies and a cover.

Since covering with a suitable corrosion-and abrasion resistant coating material takes place before as well as after the deformation stage in the production of tins, special anti-corrosion materials are required. Particularly high demands are made of the coating material if the deformation stage is to occur after the metal substrate has been finished with a corrosion-and-abrasion resistant coating material. In such finishing systems, coating materials are required that possess a high degree of flexibility and toughness, while also possessing good adhesion characteristics on the contact surface thereof. Furthermore, the porosity of the coating film—particularly in the case of low film thicknesses—should not be permitted to increase so as to prevent a substantial loss of corrosion resistance. In order to be able to meet these and other requirements with the hot melt compositions according to the invention, it was unexpectedly discovered that backbone polymers are required which, due to their structure, can readily achieve this purpose. A preferred example of such backbone polymers according to the invention are the polymerisable cellulose esters and ethers as well as the functionalized polyesters and their copolymers possessing a "comb-like structure". By adding these straight chain polymers in proportions of $\geq 3$ weight percent, preferably $\geq 5$ weight percent, and most desirably $\geq 10$ weight percent, coating materials can be produced, which according to the Erichsen Test, can be deep drawn up to 15 times their length. At the thickness values given above, the sheet metal would be the first to rupture or tear under deep drawing.

Similar requirements have also been made where bodies or products formed from planar plastic substrates or materials are finished with a corrosion-and-abrasion resistant protective and/or barrier film are produced. In these applications, the polymerized melt compositions should possess a high degree of flexibility, particularly whenever hollow bodies are produced from the melt composition coated substrates by a deep drawing method.

A further feature of the invention is the preparation and finishing of planar substrates and formed bodies with the melt composition according to the invention. With regard to processing the melt composition according to the invention, a distinction should be drawn between an - in -line operation, and an - off-line operation. The in-line system has the advantage that the prepared melt composition is worked immediately after it is prepared and therefore does not have to undergo a second melting operation. This fact provides significant advantages for thermo-sensitive melt compositions, in particular those which do not contain either stabilizers or antioxidants, since the thermal load is relatively short-lived and the danger of degradation product formation is relatively remote. This system is, in addition, more economical and furthermore, the "heat history" of the plastic materials is not able to cause additional problems in the system.

In the off-line operation, the granulates may be premelted inside a low-pressure melting tank. The premelted mass, inside-the melting tank, may then flow to a main melting phase or stage and from this point, it may be is pumped by e.g., a gear pump through heated conduits to an application device.

Where barrels or the like are to be sealed, the melt compositions may be melted by means of a barrel sealing apparatus fitted with a heatable plate and a gear pump and then pumped through heated tubes to the application device. The advantage of both systems is that only as much melt composition is melted down as is consumed or dispensed by the application device. Both systems employ conventional technology.

On one hand, since the melt compositions according to the present invention have a relatively high viscosity at application temperatures and on the other hand during polymerisation, e.g. through free radicals or by means of UV or electron irradiation in the presence of atmospheric oxygen can feature reaction inhibition on the surface, it has unexpectedly proven advantageous not only to cover the melt composition to be applied with an inert gas but with the latter to create a foam which leads to the formation of a melt composition foam whose viscosity is also lower. Thus, the melt compositions can not only be diluted with an inert gas, but in addition to being protected against decomposition due to thermal oxidation, can be protected against oxygen inhibition. Foam processes are known from the literature, e.g. from Larry Trevathan, NORDSON CORP., entitled "Foam Technology in Adhesives and Sealants", TAPPI Hot Melt symposium, Hilton Head, SC, June 1–4, for inert, physically setting hot melt adhesives, whose role is primarily that of reducing the amount of melt adhesives applied to the surfaces and edges of materials.

An unexpected discovery of the present invention is that when planar substrates with band widths of up to 3 meters are being finished e.g., by a coil coating technique, the "diluted" hot melt composition created by the foam has the additional advantage that the flow levelling and wetting properties of the melt compositions are considerably improved. Even when a spray method is used to apply the hot melt composition according to the invention, the creation of a foam by using inert gases is a great advantage, as has been surprisingly discovered.

Such inert gas can be $N_2$, $CO_2$ etc., and according to the invention can be pre-warmed to the application temperature of the hot melt composition before being combined with the melt composition. The porosity or, rather, the foam structure also affects the controllable rheological characteristics of the hot melt composition.

Where low coating weights are involved, in order to achieve the appropriate application viscosity on top of the substrate, which in turn is necessary in order to achieve optimal wetting over the entire surface to thereby obtain adhesion, and particularly where high application speeds are employed, the substrates should also be prewarmed. If the warm or hot melt compositions are applied to a cold substrate surface at room temperature, the composition at the boundary surface or interface between the substrate surface and melt composition would cool excessively and thus not ensure complete wetting or adhesion to the entire surface. The wetting angle of a substrate depends upon the viscosity of the coating material used.

With respect to the pre-warming of the substrates, it is necessary to distinguish between different types of substrates. However, it is most preferred that all types of substrates should be pre-warmed to at least $\geq +50°$ C. in order to retard the heat loss from the melt composition.

It has also been discovered that it is advantageous to pre-warm metal substrates to the application temperature of the melt compositions. The pre-warming process feature can take place, according to the invention, either before or after the application of the melt composition by means of inductive warming and/or direct heating by flame treatment to the substrate. The surface may, naturally, also be prewarmed by either a hot air stream or infrared light. The inductive pre-warming technique is not only economical, but permits the desired temperature to be reached during a shorter pre-warming phase under more precise microprocessor control.

Plastic substrates, on the other hand, must not be heated up to such a degree, because thermoplastic substrates soften rapidly. Depending on the type of substrate, such as e.g., PE, PP,PVC etc., the pre-warming phase should occur at 10° C. below the plasticization point. When non-polar substrates are to be coated, surface treatment by flame or corona discharge can improve wettability and therefore adhesion. It is particularly advantageous, however, to use surface flame treatment techniques employing e.g., a propane gas flame, which in addition to achieving the desired degree of pre-heating of the surface, is very economical.

In order to finish these substrates, it is advantageous to use melt compositions according to the invention that feature relatively low processing temperatures. In contrast to the process used to coat metal substrates, the counter-pressure drum should cool in the direction of application, so that once the entire surface has been wetted, potentially injurious heat can rapidly be drawn off from the plastic substrate and the melt composition.

Preheating of substrates of cellulose and inorganic materials should be carried out taking into consideration the thermo-sensitivity of these materials. It is, however, advantageous to pre-heat these materials to $\geq +100°$ C.

The hot melt composition according to the invention can be applied by mean of any of the following application equipment:—heated multi-roller application equipment; slotted nozzles or blades;—spray guns;—or other similar equipment. When a hot melt composition foam is being applied, the drum slots should have variable adjustments since the melt composition foam is dissipated only at the smoothing roller (i.e. the counter-pressure roller).

Polymerisation, i.e. curing or cross-linking of the melt compositions according to the invention takes place immediately after the planar substrates or the formed bodies have been finished with the melt compositions. This polymerization process can take place using a free radical method involving e.g., peroxide and hydroperoxide initiators in the presence of heat, or by means of UV or electron radiation. A unique and preferred form of polymerization is that using electron radiation, particularly if the melt composition according to the invention is to be employed in the coating of substrates destined for use in the foodstuff and pharmaceutical industries. The use of the electron beam technique permits polymerization i.e., curing or crosslinking to take place without the use of reaction initiators such as peroxides, photosensitizers and/or amine-containing synergists. At the same time, the electron rays serve to sterilize the substrate surface.

A further feature of the invention is that of polymerizing and curing the polymerisable hot melt composition according to the invention. In an uncured state, the melt compositions according to the invention feature thermoplastics which only through polymerization and curing can be transformed into products having duroplastic properties. The hot melt compositions, depending on their composition, form specific polymer matrixes which permit them to achieve the characteristics and features described herein.

High standards for polymerization and curing have been achieved for curing of the polymerisable melt composition according to the invention, particularly for the foodstuff, pharmaceutical and high performance industries such as vehicle manufacture. Besides outlining clearly definable inert gas and/or protective film conditions, standards relating to reaction kinetics are considered to be very important, in order to ensure the continuity of high performance standards whenever this method is used.

In the curing or polymerization phases, atmospheric oxygen has an inhibitory effect on the polymerisable melt composition since the radicals that form during the process combine more rapidly with atmospheric oxygen molecules than with ethylenically unsaturated groups. The effect of this situation is that short-chain polymerisates, which are soft and sticky, form only on the surface, the latter of which are neither scratch-nor solvent resistant. It is thus necessary for the curing i.e., polymerization stage to occur within an inert atmosphere so that known inert gases such as $N_2$ and $CO_2$ are employed. Since the cost of using inert gas for this procedure may vary, a new method has been described in DEOS 29 49 710 the teachings of which are hereby incorporated by reference; in this method water takes over the role of the inert gas in creating an inert processing phase on the surface. The water is applied as a protective layer to the lacquer surface before and/or after cross-linking. Since the film of water is produced by means of a spray gun, it is not always homogeneous. It is therefore necessary, particularly in the case of hydrophobic lacquer surfaces, to add to the water, a substance that reacts on the surface so as to create a wetting angle that permits wetting of the entire surface. At the same time, the surface-active wetting agents, particularly when applied with a spray gun, can foam when in the aqueous phase. This method permits control of surface hardening. Since the surface-active substances suitable for these purposes are not always physiologically innocuous and/or can negatively affect the sensory qualities of a packaged product, coating films cured under such conditions can not be employed in the foodstuff and pharmaceutical fields.

Although pure water could be an ideal protective film during the curing and polymerization stages, especially if such procedures involved the use of electron rays, the technology described in DE-OS 29 49 710, at least for the production of corrosion-resistant packaging materials for use in the foodstuff and pharmaceutical industries, is either not suitable for or has not been sufficiently developed to ensure even curing of coating films.

In the search for an improved means of producing a protective film of potable or desalted water, a method was discovered for producing such a water film from an atmosphere containing high relative humidity. Since the applied hot polymerisable melt compositions of this invention, and the underlying substrates must be cooled, the quantity of heat thus available can be used to create an atmosphere having a high relative humidity. Before the warm (or hot) coated substrates enter the polymerization-or curing room-or chamber, cold potable or desalinated water may be sprayed onto the hot surface, causing the water to evaporate, producing high relative humidity atmosphere. At the same time, the coated substrates are cooled off in order to cause water from the high relative humidity atmosphere to condense out upon the uncured surface of the melt composition. This condensation serves as an ideal protective film, as has been found with this invention, since in comparison to a film created by spraying water, such condensation remains for a short time in a very thin and homogeneous film on a hydrophobic surface while temporarily possessing "polymer characteristics".

This method, which is an objective of the invention, plays an important role in ensuring that the protective water film formed above the existing dew point provides a consistently high cross-linking density even during rapid curing and polymerization and a surface free of foreign matter.

After curing and polymerization, the remaining dew or water condensate can be blown off with hot air and/or caused to evaporate with the aid of other energy sources, such as infrared rays.

The curing or polymerization of the polymerisable hot melt composition according to the invention takes place through a free radical polymerization in the presence of reaction initiators from the peroxide group, e.g., benzoylperoxide, hydroperoxides, e.g., cumenehydroperoxide and many others; or actinic light especially UV radiation in wavelengths from 380 to 100 nm in the presence of photoinitiators such as e.g., benzophenone, benzoin ether, Michler's ketone, methylthioxanthone, ketals, and if required further synergists such as amines, tertiary amino alcohols; and/or by means of electron radiation in the low-energy acceleration range from 150 to 300 keV and a preferred, effective penetration depth from 3 to 400 $g/m^2$, as well as a dose of from 0.5 to 10 millirads, in particular 1.0 to 6.0, and dose scattering of approximately ±10%, preferably ±3%.

BRIEF DESCRIPTION OF THE DRAWINGS

The finishing of substrates and formed bodies with the hot melt compositions according to the invention is shown in the drawings, illustrating preferred embodiments and in which the figures shown are

FIG. 2 is a schematic perspective illustration showing another embodiment of the application of the compositions of the present invention;

FIG. 3 is a perspective schematic illustration showing an alternative to that of FIG. 2.

Figure 1:
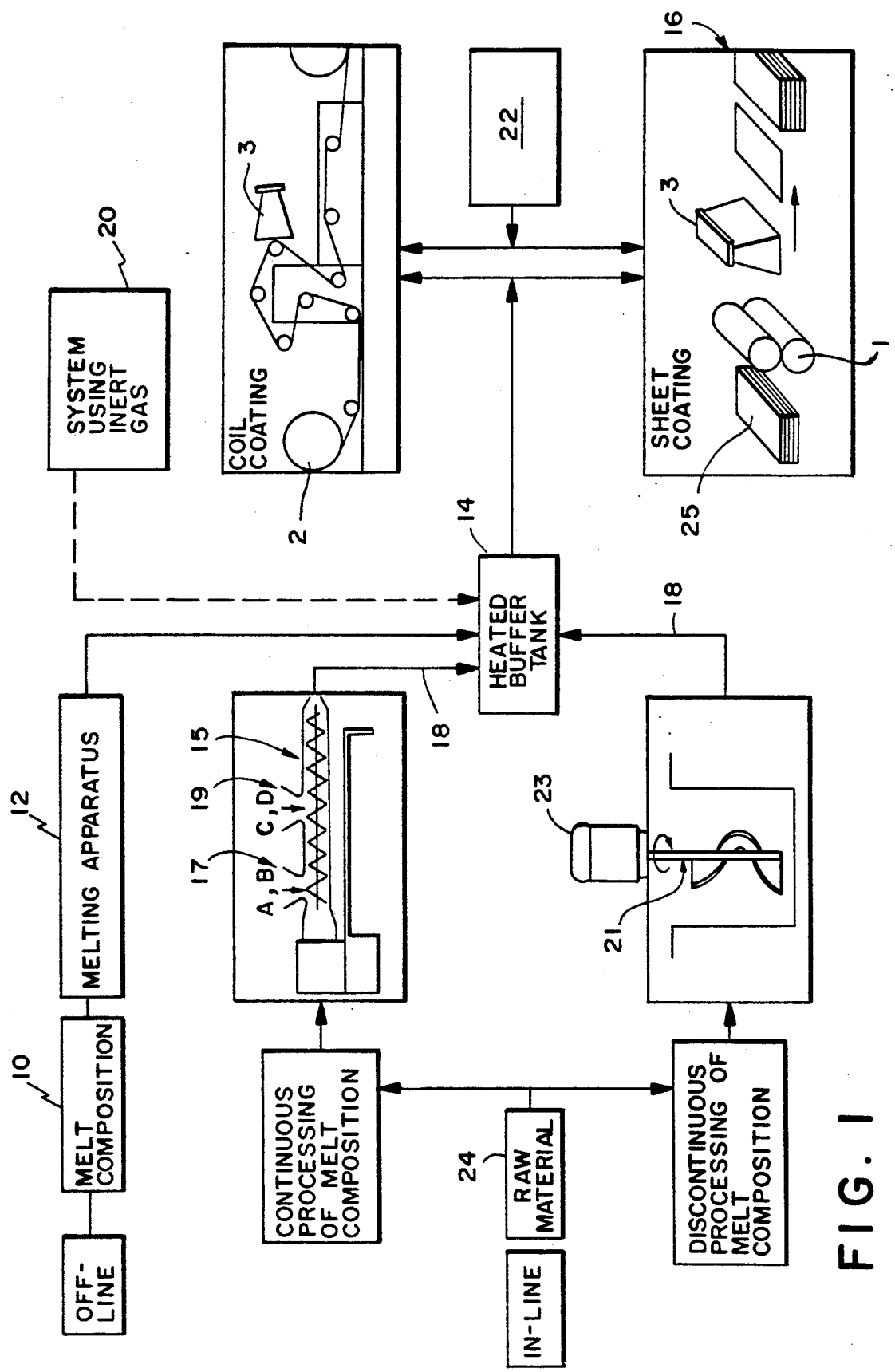
FIG. 1 is a schematic diagram showing processing according to the present invention for one embodiment.

Reference to the detailed features of the drawing will be made hereinafter, which show different combinations of the process used in the present invention to meet different technical requirements.

In the production of formed bodies or products using coated substrates, various process parameters exist that critically affect the functions and properties of the processed material. One such critical process parameter is that of deformation depth. In order to be able to meet such criteria with the melt compositions of the present invention, for instance in cases where the stretching ability or extensibility of the cured coating no longer corresponds to the deformation depth of the carrying material, the process parameters applicable hereto, as has been unexpectedly discovered, can be modified.

It is thus a further feature of this invention, in accordance with the teaching of the hot melt compositions described herein, to further develop finishing and deformable materials capable of meeting industrial requirements. This can be satisfied according to this invention in that the planar substrates are finished with one of the hot melt compositions of the invention, which hot melt composition(s) are subsequently polymerized or cross-linked with free radicals by heat or by radiation, the substrate deformed and the coating material completely cross-linked or hardened on the thus formed body by means of free radicals and/or radiation.

The invention will be described in greater detail in the following examples without being limited thereto.

Table 1 describes various properties of monomeric, dimeric and oligomeric acrylic acids.

Table 2 describes properties of various esters of monomeric acrylic acids and esters of acryloxy-propionic acids.

Tables 3 and 4 summarize the properties and/or characteristics of the preferred backbone polymers for use in the present invention.

TABLE 1

Physical properties of monomeric, dimeric and oligomeric acrylic acids.

| Properties | acrylic acid | methacrylic acid | acryloxy-propionic-acid | mixture of di- to penta-meric acrylic acids |
|---|---|---|---|---|
| molecular weight | 72 | 86 | 144 | 175 |
| boiling point °C. | 141 | 160 | 96–98 (0.1 mm) | 96–97 (0.1 mm) |
| freezing point °C. | 13.5 | 15 | −20 | −20 |
| density at 20° C., g/cm³ | 1.0511 | 1.0153 | 1.2019 | 1.202 |
| viscosity, mPa.s | 1.3 | 1.3 | 30–32 | 150 |
| glass transition temperature $T_g$ °C. | 105 | 22 | 22 | 12 |
| pKa (monomer) | 4.25 | 4.43 | 3.9 | 3.9 |
| pKa (polymer)/50% ethanol | 8.8 | 9.5 | 8.1 | 8.1 |

TABLE 2 comparative properties between esters of monomeric acrylic acids and esters of acryloxy-propionic-acids.

| | molecular weight | 25° C. viscosity #2/30 mPa.s | density g/cm³ | boiling point °C. | freezing point °C. | polymerization shrinkage % |
|---|---|---|---|---|---|---|
| Esters of acryloxy-propionic-acid with: | | | | | | |
| trimethylolpropane | 550 | 700–800 | 1.2 | >300 | <−20 | 10.0 |
| diethylene glycol | 380 | 50–70 | 1.13 | >300 | <−20 | 9.1 |
| neopentyl glycol | 380 | 70–100 | 1.19 | >300 | <−20 | 9.7 |
| Esters with mixtures of di- to penta-meric acryloxy-propionic acids and: | | | | | | |
| trimethylolpropane | 580 | 750 | 1.195 | >300 | <−20 | 10.1 |
| diethylene glycol | 400 | 90 | 1.178 | >300 | <−20 | 9.2 |
| Esters of monomeric acrylic acid with: | | | | (1 mm) | | |
| trimethylol propane | 296 | 100 | 1.1 | >180 | −25 | 14.6 |
| diethylene glycol | 214 | 8.0 | 1.08 | 240 | −20 | 14.4 |

TABLE 3

Polymerizing cellulose esters.

| | molecular weight | | $T_g$(°C.) | melting point °C. | contents of functional groups | | % wt OH number |
|---|---|---|---|---|---|---|---|
| | $\overline{M}_w$ | $\overline{M}_w/\overline{M}_n$ | | | acryl-, % wt | acryloxy-propionic- % wt | |
| cellulose ester 3A | 36,000 | 4.5 | 95 | 110–125 | — | 0.8 | 1.1 |
| cellulose ester 4A | 185,000 | 18.5 | 118 | 155–165 | — | 0.6 | 1.4 |
| cellulose ester 6A | 61,000 | 2.8 | 118 | 150–160 | 1.5 | 1.5 | 3.8 |

TABLE 4

Polymerizing copolyesters

| | viscosity 120° C., Pa.s | molecular weight | | $T_g$ (°C.) | Acid No. mg KOH/g | OH Number | contents of offunctional groups | |
|---|---|---|---|---|---|---|---|---|
| | | $\overline{M}_w$ | $\overline{M}_w/\overline{M}_n$ | | | | acryl- % wt | acryloxy-propionic- % wt |
| copolyester 1A | 8 | 2,000 | 2.9 | −10 | 8.5 | 9 | — | 1.8 |
| copolyester 2A | 14 | 4,000 | 3.5 | +10 | 6.4 | 7 | — | 1.4 |
| copolyester 3A | 13 | 3,000 | 3.2 | +10 | 6.2 | 8 | 0.08 | 0.08 |

EXAMPLE 1

30 parts by weight of cellulose ester 3A were dissolved in 70 parts by weight of the following compounds: propoxy-trimethylol-propane-triacrylate (substance 1), trimethylol-propane-triacrylate (substance 2) and trimethylol-propane-triacryloxy-propionate (substance 3), in each case at 125° C. to prepare hot-melt compositions and which were then degassed in vacuum. The substances were cooled to +80° C. and films formed on siliconized paper to a thickness of 12 microns. Thereupon the films were cured at different radiation doses of electron beams. The Table below shows the results:

| hot-melt substance # | electron-beam dosage (mrad) | tensile strength (N/mm²) | elong. (%) |
|---|---|---|---|
| 1 | 1 | 6.5 | 7.0 |
| | 2 | 21.0 | 3.2 |
| | 3 | 32.0 | 2.8 |
| 2 | 1 | film too brittle for testing | |
| | 2 | | |
| | 3 | | |
| 3 | 1 | 45.0 | 6.8 |
| | 2 | 49.0 | 5.9 |
| | 3 | 52.0 | 5.2 |

This Example shows that due to higher reactivity, among other factors, of the acryloxy groups, higher tensional strengths were achieved at fairly low radiation dosage and that because of the decreased crosslinking density appreciably improved elongations were achieved relative to the conventional backbone polymers and reactive monomers.

EXAMPLE 2

Three hot-melt substances were prepared each comprising 5 parts by weight of cellulose ester 4A by dissolving each in 95 parts by weight of one of the following compounds: propoxy-trimethylol-propane-triacrylate (substance 1), trimethylol-propane-triacrylate (substance 2), trimethylol-propane-triacryloxy-propionate (substance 3) at 100° C., and then degassed. Thereupon the hot-melt substances were cooled to +70° C. and 5 micron thick films were prepared on aluminum sheet metal strips. These wet films were cured with low electron beam radiation doses. The cured films were subjected to the toluene rub-off test. The solvent abrasion test was carried out in such a way that a surface of about 1 cm² of the cured film was wetted with 10 drops of toluene and thereupon was stressed fifty times by means of a wire-wound rod #4 in a back and forth cycle. The following results were observed. If according to this test at least 50 cycles are obtained, the coating can be regarded (depending upon the electron-beam dosage and cross-linking density obtained) as being excellent, thus demonstrating improved abrasion resistance.

| electron-beam dosage (mrad) | Substance #1 | Substance #2 | Substance #3 |
|---|---|---|---|
| 0.1 | 20 | 10 | 50 |
| 0.2 | 24 | 17 | OK |
| 0.3 | 38 | 28 | |
| 0.4 | 50 | 42 | |
| 0.5 | OK | OK | |

These results corroborate not only the higher reactivity of the compounds functionalized with acryloxy-propionic-acid, but they also demonstrate the improved abrasion resistances obtained.

EXAMPLE 3

15 parts by weight of cellulose ester 6A and 65 parts by weight of copolyester 1A are admixed together under molten conditions at +180° C. in the melting kneader and are homogeneously mixed. The moment a homogeneous melt is achieved, the substance is degassed in vacuum.

EXAMPLE 4

85 parts by weight of copolyester 2A are heated at 100° C. to a molten state in the melting kneader and thereupon 5 parts by weight of cellulose ester 3A and 10 parts by weight of trimethylol-propane-triacryloxy-propionate (MG 580) are added. As soon as all ingredients have been homogeneously mixed, the substance is degassed in vacuum.

EXAMPLE 5

80 parts by weight of copolyester 3A are processed jointly with the cellulose ester 3 of German patent application P 36 41 436.0-43 at 130° C. in the melting kneader and once a homogeneous mixture has been obtained are degassed in vacuum.

EXAMPLES 6-14

Examples 6 through 14 below (Table 5) describe hot-melt substances of polymer (A), polymer (B) and/or polymer (C) of German published patent application P 36 41 436.0-43 and of components (A), (B) and (C) of the present invention. The individual raw materials are prepared in the manner described in one of the Examples 1 through 5.

TABLE 5

| Raw Materials | Examples/Parts by weight | | | | | | | | |
|---|---|---|---|---|---|---|---|---|---|
| | 6 | 7 | 8 | 9 | 10 | 11 | 12 | 13 | 14 |
| Polymer A | | | | | | | | | |
| Celluloseester 3 | 10 | — | — | — | — | — | — | — | — |
| Celluloseester 4 | — | 5 | — | 15 | — | — | — | — | — |
| Celluloseester 3A | 10 | — | 20 | — | 20 | 10 | — | — | 10 |
| Celluloseester 4A | — | 5 | — | — | — | — | — | — | — |
| Polyvinylalcohol MG 18.000, 0,4% | — | — | — | — | — | — | 10 | — | — |
| Acryloxy-propionic-acid | 50 | 25 | 50 | — | — | 40 | — | — | — |
| Novolakacryloxy-propionate | | | | | | | | | |
| Polymer B | | | | | | | | | |
| Copolyester 1 | — | 65 | — | — | 20 | — | — | 20 | 10 |
| Copolyester 2 | — | — | — | — | — | — | — | — | — |
| Copolyester 1A | — | — | — | — | 20 | — | — | 40 | 20 |
| Copolyester 2A | — | — | — | — | — | — | 60 | — | 20 |
| Oligomer C | | | | | | | | | |
| TMPTA₂* | 30 | — | 30 | 85 | 30 | 45 | 20 | — | 10 |
| DEGDA₂* | — | — | — | — | 10 | — | — | — | 10 |
| silicone acrylate* | — | — | — | — | — | 5 | — | 20 | — |
| Bisphenol-A-diacryloxypropionate | — | — | — | — | — | — | 10 | 20 | 20 |

*TMPTA₂ = Trimethylolpropantriacryloxypropionate
DEGDA₂ = Diethylengly oldiacryloxypropionate
silicone acrylate = content in dimeric acrylic acid (acryloxy-propionic-acid) of about 20% by weight

EXAMPLE 15

The hot-melt substances of Examples 3 through 14 are raised to the particular required application temperature of between 100° and 140° C. in the melt kneader or melt dissolver and were used to coat substrates of aluminum, steel, polyvinyl chloride and Kraft paper. The test substrates (18×12.5 cm) were coated with a hot melt coating material in weights ranging from 3 to 10 g/m². The substrates and the application doctor blade were preheated to various temperatures. Depending on the curing process used, the reaction initiators listed below were added to the polymerizable melt composition shortly before application:

| Free-radical curing | 1.8% by weight of dicumyl peroxide (50% in plasticizer) |
|---|---|
| UV curing | 3.0% by weight of IRGACURE 184 |
| Electron-beam curing | no additive |

The curing conditions were as follows:

| Free-radical curing: | (a) | metals: 150–200° C. |
|---|---|---|
| | (b) | PVC: 120° C. |
| | (c) | Kraft paper: 140° C. |
| UV curing | | 30 seconds with UV lamp, 80 watt/cm² in nitrogen atmosphere |
| Electron-beam curing | | 1 to 3 millirads |
| | (a) | inert gas, N₂ |
| | (b) | film of condensed out water |

After the hot-melt substances had cured on the various substrates, the resulting coated substrates were stored for 24 hours at 23° C. and then their adhesion properties were tested before and after a sterilization test had been carried out. The sterilization conditions employed included steam treatment for 60 minutes at +129° C. Adhesion was ascertained by the known cross-cut test and the adhesive-tape test (TESAFILM 154). Table 6 shows the test results.

| | Rating criteria |
|---|---|
| very good = | smooth cut edges for the cross-cut test, no lifting of tape in adhesive-tape test; no clouding of coating film after steam sterilization |
| good = | smooth cut edges for the cross-cut test, no detachment of tape in adhesive-tape test; slight clouding of coating film after steam sterilization |
| satisfactory = | the cut edges still are smooth, no tape detachment in adhesive-tape test; clouding of coating film following steam sterilization |
| unsatisfactory = | poor adhesion in cross-cut test. |

TABLE 6

| Hot-melt Composition No. | Substrate | Temperature of application °C. | Type of Curing | Adhesion (cross-cut test with adhesive tape) | |
|---|---|---|---|---|---|
| | | | | 20° C. | After sterilization |
| 3 | Tin plate | 130 | EBC 1 mrad | very good | good |
| 4 | Aluminum | 130 | EBC 1 mrad | very good | very good |
| 5 | Steel | 130 | EBC 1 mrad | very good | very good |
| 6 | Tin plate | 140 | EBC 2 mrad | very good | good |
| 7 | Aluminum | 140 | EBC 3 mrad | very good | very good |
| 8 | Tin Plate | 120 | EBC 1 mrad | good | good |
| 9 | PVC | 120 | EBC 2 mrad | very good | good |
| 10 | Paper | 140 | uv | good | satisfactory |
| | | | FRH | good | good |
| 11 | Aluminum | 120 | EBC 2 mrad | very good | very good |
| 12 | Steel | 130 | EBC 3 mrad | very good | good |
| 13 | Tin plate | 140 | EBC 1 mrad | very good | good |
| 14 | Steel | 120 | EBC 1 mrad | very good | very good |

EBC = Electron Beam Curing
MRAD = Millirad
UV = Ultraviolet
FRH = Free Radical Hardening (Curing)

The finishing of substrates and formed bodies with the hot melt compositions according to the invention is demonstrated using planar substrates in the drawings, which will now be described in further detail.

Referring to FIG. 1 initially, there is illustrated continuous and discontinuous apparatus and a system for processing the hot melt composition. As shown in FIG. 1, a hot melt composition source 10 is fed to a melting apparatus 12, and then to a heated buffer tank 14. From there, hot the melt composition may be fed directly to application equipment indicated generally by reference numeral 16 for applying the hot melt composition to a substrate, and which is described hereinafter in greater detail. In this equipment, a supply or source of sheet material to be coated is indicated by reference numeral 25, which are in the form of individual sheets as opposed to the coil arrangement representing a continuous source of material.

As illustrated in the schematic drawing of FIG. 1, there are two systems illustrated, one being continuous and the other being discontinuous. In either case, hot melt feed from the continuous or discontinuous system is fed to the buffer tank 14 through appropriate conduits, e.g., conduit 18.

FIG. 1 also illustrates the systems which may optionally employ a foam generation system - i.e., in combination with an inert gas, and which is indicated by reference numeral 20. As also noted, the different systems may employ sheet/film pre-heating means indicated by reference numeral 22 which may be by, e.g., induction heating.

In the continuous/discontinuous systems of FIG. 1, a source of raw material indicated by supply means 24 may be provided for such systems. With respect to the continuous system illustrated in FIG. 1, an extruder 15 may be employed with feed inlets 17 and 19 for feeding components, e.g., (A) and (B) on one hand and (C) and (D) on the other hand. Feeding through this particular system need not be through inlets 17 and 19. In the case of the discontinuous system, there may be employed a melt-kneader indicated generally by reference numeral 21 which includes a motor 23. As otherwise explained herein, other systems may be employed for this purpose.

Figure 4:
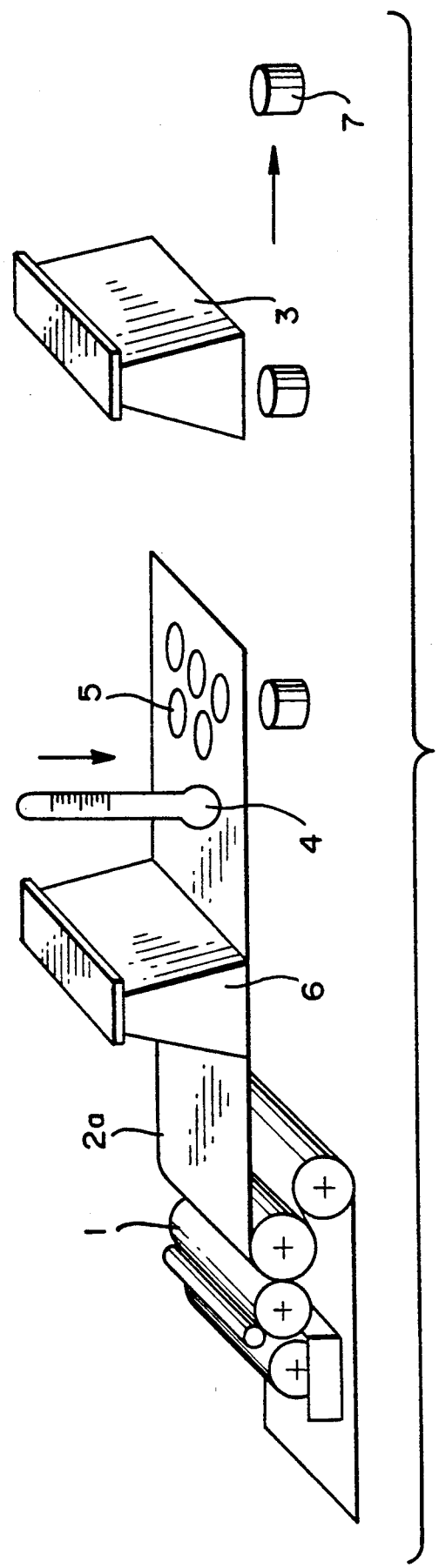
FIG. 4 is a perspective schematic illustration showing an alternative to that of FIG. 2.

FIGS. 2 to 4 demonstrate, by way of example, a method for producing formed bodies from a coiled sheet, which includes the application and cross-linking of the melt compositions of this invention.

Referring now to FIG. 2, there is illustrated a first combination according to the present invention, in which a coil 2 of material to be formed into a substrate or body is provided, which is unwound into a web 2a and then fed through a coating apparatus generally indicated by reference numeral 1, where a hot melt composition is applied to the web 2a. With the temperature remaining high, the hot melt composition undergoes cross-linking with an electron radiation device 3, such as an electron beam curing apparatus. The activity of the molecules is such that in the melt composition, beneficial reactivity for cross-linking purposes during curing is promoted. A cooling device indicated by reference numeral 4 is provided to cool the sheet and coating composition as it is transmitted to a forming station indicated generally by reference numeral 5, where bodies or containers 7 are formed.

Referring now to FIG. 3, a second combination is illustrated, in which a somewhat different process path to that previously described, which offers some ideal product-forming conditions. After a hot melt composition has been applied by a coating apparatus 1, and treatment with an electron beam curing device 3, and with subsequent cooling of the sheet by cooling means 4, a forming station 5 is employed to form bodies 7. This option, which involves the preparation of special melt compositions, is of a practical application since in the process, the melt viscosity rises very sharply during cooling. The anti-corrosion layer is, however, very elastic so that sheet deformation will not produce microtearing, porosity, etc. Radiation cross-linking will take place after the sheet has been formed into a body. In this respect, it should be noted that fluctuations in radiation dosage to the formed bodies must be restricted (such variation being a function of the distance between the radiation device and the formed body). An extreme deep-draw ratio should thus normally be avoided for that purpose. This process may, however, be employed in the metal packaging industry, as in i.e., the production of fish tins and covers, whereby the deep-draw ratio is not too great.

Referring to FIG. 4, a third combination is illustrated which is applicable in the event that the increase in viscosity is not sufficient to complete the production of a formed body according to the above second combination; this third combination provides a further option for superficially cross-linking an applied melt composition by bombarding the latter with a weak electron stream (e.g., 0.5 to 1.0 millirads) with a device 6 suitable for this purpose. The resultant superficial cross-linking and the subsequent cooling phase indicated by reference 4 raises the viscosity sufficiently to enable the melt composition to withstand the subsequent forming process 5. The formed body or product can then be moved to the final cross-linking stage using an electron beam curing device 3, where in accordance with the second combination described above, formed bodies with a minimal deep-draw ratio can be processed.

We claim:

1. A solvent-free, low-monomer or monomer-free, polymerizable hot melt suitable for use as a corrosion and abrasion resistant coating for formation of a protective film with barrier properties on planar substrates and shaped bodies of metal, plastics, cellulose materials and/or inorganic materials, comprising a polymerizable component selected from the group consisting of
   (A) at least one polymerizable, hydroxyl-containing polymer having an average molecular weight ($\overline{M}_w$) of between about 1,000 and about 500,000 and a glass transition temperature ($T_g$) $\geq +20°$ C.;
   (B) at least one polymerizable, linear straight chain or branched polyester or copolymer thereof having an average molecular weight ($\overline{M}_w$) between about 800 and about 50,000 and a glass transition temperature ($T_g$) $\geq -50°$ C.;
   (C) components (A) and (B) in admixture; and
   (D) at least one of compounds (A) and (B) in admixture with a polymerizable, ethylenically-unsaturated group carrying oligomer consisting of acrylic, methacrylic, ether, ester, urethane, amide, imide, epoxy, siloxane, phenol, novolak or mercapto compounds and having an average molecular weight ($\overline{M}_w$) of about 400 to about 10,000 and
wherein at least one of said polymerizable components present in said hot melt is functionalized with at least one dimeric or oligomeric acrylic acid of the formula

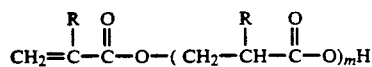

where each R may independently be H, -CN, halogen, or an alkyl group having from 1 to 4 carbon atoms, and m is a number between 1 and 5.

2. A hot melt in accordance with claim 1, wherein at least one of said polymerizable compounds is at least a partially crystalline compound.

3. A hot melt in accordance with claim 1, wherein said hydroxyl-containing polymer (A) is a cellulose derivative.

4. A hot melt in accordance with claim 3, wherein at least one of said polymerizable compounds is at least a partially crystalline compound.

5. A hot melt in accordance with claim 3, wherein said hydroxyl-containing polymer (A) is cellulose ester, cellulose ether or a mixture thereof, containing at least about 0.1% by weight of reactive acrylic groups, methacrylic groups or mixtures thereof, and having an average molecular weight ($\overline{M}_w$) between about 10,000 and about 250,000.

6. A hot melt in accordance with claim 4, wherein said hydroxyl containing polymer A is cellulose ester, cellulose ether or a mixture thereof, containing at least about 0.1% by weight of reactive acrylic groups, methacrylic groups or a mixture thereof and having an average molecular weight ($\overline{M}_w$) between about 10,000 and about 250,000.

7. A hot melt in accordance with claim 1, wherein said hydroxyl containing polymer (A) is a polyvinyl alcohol derivative containing $\geq 0.1\%$ by weight of reactive acrylic groups, methacrylic groups or a mixture thereof and having an average molecular weight ($\overline{M}_w$) between about 10,000 and about 100,000 and a glass transition temperature ($T_g$) of $\geq +20°$ C.

8. A hot melt in accordance with claim 2, wherein said hydroxyl containing polymer (A) is a polyvinyl alcohol derivative containing $\geq 0.1\%$ by weight of reactive acrylic groups, methacrylic groups or a mixture thereof and having an average molecular weight ($\overline{M}_w$) between about 10,000 and about 100,000 and a glass transition temperature ($T_g$) of $\geq +20°$ C.

9. A hot melt in accordance with claim 1, wherein said hydroxyl containing polymer (A) is a phenol- or novolak-derivative containing $\geq 0.1\%$ by weight of reactive acrylic groups, methacrylic groups, or mixture thereof and having an average molecular weight ($\overline{M}_w$) between about 1,000 and about 50,000 and a glass transition temperature ($T_g$) of $\geq +20°$ C.

10. A hot melt in accordance with claim 2, wherein said hydroxyl containing polymer (A) is a phenol or novolak derivative containing $\geq 0.1\%$ by weight of reactive acrylic groups, methacrylic groups, or mixture thereof and having an average molecular weight ($\overline{M}_w$) between about 1,000 and about 50,000 and a glass transition temperature ($T_g$) of $\geq +20°$ C.

11. A hot melt in accordance with claim 1, wherein the polymer (B) is a linear, straight-chain polyester or copolyester, or a mixture thereof, or a branched polyester or copolyester or a mixture thereof, or a mixture of (1) said straight chain polyester or copolyester or mixtures thereof and (2) said branched polyester or copolyester or mixture thereof, said polymer (B) containing $\geq 0.1\%$ by weight of reactive acrylic groups, methacrylic groups, or a mixture thereof and having an average molecular weight ($\overline{M}_w$) between about 1,000 and about 20,000 particularly between 1,000 and 10,000, and a glass transition temperature ($T_g$) of $\geq +50°$ C.

12. A hot melt in accordance with claim 2, wherein the polymer (B) is a linear, straight-chain polyester or copolyester, or a mixture thereof, or a branched polyester or copolyester or a mixture thereof, or a mixture of (1) said straight chain polyester or copolyester or mixtures thereof and (2) said branched polyester or copolyester or mixture thereof, said polymer (B) containing $\geq 0.1\%$ by weight of reactive acrylic groups, methacrylic groups, or a mixture thereof and having an average molecular weight ($\overline{M}_w$) between about 1,000 and about 20,000, and a glass transition temperature ($T_g$) of $\leq +50°$ C.

13. A hot melt in accordance with claim 3, wherein the polymer (B) is a linear, straight-chain polyester or copolyester, or a mixture thereof, or a branched polyester or copolyester or a mixture thereof, or a mixture of (1) said straight chain polyester or copolyester or mixtures thereof and (2) said branched polyester or copolyester or mixture thereof, said polymer (B) containing $\geq 0.1\%$ by weight of reactive acrylic groups, methacrylic groups, or a mixture thereof and having an average molecular weight ($\overline{M}_w$) between about 1,000 and about 20,000, and a glass transition temperature ($T_g$) of $\leq +50°$ C.

14. A hot melt in accordance with claim 4, wherein the polymer (B) is a linear, straight-chain polyester or copolyester, or a mixture thereof, or a branched polyester or copolyester or a mixture thereof, or a mixture of (1) said straight chain polyester or copolyester or mixtures thereof and (2) said branched polyester or copolyester or mixture thereof, said polymer (B) containing $\geq 0.1\%$ by weight of reactive acrylic groups, methacrylic groups, or a mixture thereof and having an average molecular weight ($\overline{M}_w$) between about 1,000 and about 20,000, and a glass transition temperature ($T_g$) of $\leq +50°$ C.

15. A hot melt in accordance with claim 5, wherein the polymer (B) is a linear, straight-chain polyester or copolyester, or a mixture thereof, or a branched polyester or copolyester or a mixture thereof, or a mixture of (1) said straight chain polyester or copolyester or mixtures thereof and (2) said branched polyester or copolyester or mixture thereof, said polymer (B) containing $\geq 0.1\%$ by weight of reactive acrylic groups, methacrylic groups, or a mixture thereof and having an average molecular weight ($\overline{M}_w$) between about 1,000 and about 20,000, and a glass transition temperature ($T_g$) of $\leq +50°$ C.

16. A hot melt in accordance with claim 11, wherein the average molecular weight of polymer (B) is between about 1,000 and 10,000.

17. A hot melt in accordance with claim 12, wherein the average molecular weight of polymer (B) is between about 1,000 and 10,000.

18. A hot melt in accordance with claim 13, wherein the average molecular weight of polymer (B) is between about 1,000 and 10,000.

19. A hot melt in accordance with claim 14, wherein the average molecular weight of polymer (B) is between about 1,000 and 10,000.

20. A hot melt in accordance with claim 15, wherein the average molecular weight of polymer (B) is between about 1,000 and 10,000.

21. A hot melt in accordance with claim 1, wherein said polymer (B) is a hydroxyl-containing basic polyester selected from the group consisting of
   (a) a hydroxyl polyester having branched chains of polyester units with branches at three or more polyester forming functions, and
   (b) a hydroxyl polyester with alkyl side chains linked through ester or ether groups of three or more polyester forming functions, and containing $\geq 0.1\%$ by weight of reactive acrylic groups, methacrylic groups, or a mixture thereof and having an average molecular weight ($\overline{M}_w$) of about 1,000 to about 20,000, and a glass transition temperature ($T_g$) of $\leq +50°$ C.

22. A hot melt in accordance with claim 2, wherein said polymer (B) is a hydroxyl-containing basic polyester selected from the group consisting of
   (a) a hydroxyl polyester having branched chains of polyester units with branches at three or more polyester forming functions, and
   (b) a hydroxyl polyester with alkyl side chains linked through ester or ether groups of three or more polyester forming functions, and containing $\geq 0.1\%$ by weight of reactive acrylic groups, methacrylic groups, or a mixture thereof and having an average molecular weight ($\overline{M}_w$) of about 1,000 to about 20,000, particularly 1,000-10,000 and a glass transition temperature ($T_g$) of $\leq +50°$ C.

23. A hot melt in accordance with claim 3, wherein said polymer (B) is a hydroxyl-containing basic polyester selected from the group consisting of
   (a) a hydroxyl polyester having branched chains of polyester units with branches at three or more polyester forming functions, and
   (b) a hydroxyl polyester with alkyl side chains linked through ester or ether groups of three or more polyester forming functions, and containing $\geq 0.1\%$ by weight of reactive acrylic groups, methacrylic groups, or a mixture thereof and having an average molecular weight ($\overline{M}_w$) of about 1,000 to about 20,000, and a glass transition temperature ($T_g$) of $\leq +50°$ C.

24. A hot melt in accordance with claim 4, wherein said polymer (B) is a hydroxyl containing basic polyester selected from the group consisting of
   (a) a hydroxyl polyester having branched chains of polyester units with branches at three or more polyester forming functions, and
   (b) a hydroxyl polyester with alkyl side chains linked through ester or ether groups of three or more polyester forming functions, and containing $\geq 0.1\%$ by weight of reactive acrylic groups, methacrylic groups, or a mixture thereof and having an average molecular weight ($\overline{M}_w$) of about 1,000 to about 20,000, and a glass transition temperature ($T_g$) of $\leq +50°$ C.

25. A hot melt in accordance with claim 5, wherein said polymer (B) is a hydroxyl-containing basic polyester selected from the group consisting of
   (a) a hydroxyl polyester having branched chains of polyester units with branches at three or more polyester forming functions, and
   (b) a hydroxyl polyester with alkyl side chains linked through ester or ether groups of three or more polyester forming functions, and containing $\geq 0.1\%$ by weight of reactive acrylic groups, methacrylic groups, or a mixture thereof and having an average molecular weight ($\overline{M}_w$) of about 1,000 to about 20,000, and a glass transition temperature ($T_g$) of $\leq +50°$ C.

26. A hot melt in accordance with claim 6, wherein said polymer (B) is a hydroxyl-containing basic polyester selected from the group consisting of
   (a) a hydroxyl polyester having branched chains of polyester units with branches at three or more polyester forming functions, and
   (b) a hydroxyl polyester with alkyl side chains linked through ester or ether groups of three or more polyester forming functions, and containing $\geq 0.1\%$ by weight of reactive acrylic groups, methacrylic groups, or a mixture thereof and having an average molecular weight ($\overline{M}_w$) of about 1,000 to about 20,000, and a glass transition temperature ($T_g$) of $\leq +50°$ C.

27. A hot melt in accordance with claim 1, wherein said component (A) has a residual free monomer content of <0.01 wt. %.

28. A hot melt in accordance with claim 1, wherein said component (B) has a residual free monomer content of <0.1 wt. %.

29. A hot melt in accordance with claim 1, wherein said polymerizable, ethylenically-unsaturated group carrying oligomer contains <0.5 wt. % residual free monomer.

30. The hot melt in accordance with claim 1, wherein said component (A) has a residual free monomer content of <0.01 weight %, said component (B) has a residual free monomer content of <0.1 weight %, and said polymerizable ethylenically-unsaturated group carrying oligomer contains <0.5 weight % residual free monomers.

* * * * *

UNITED STATES PATENT AND TRADEMARK OFFICE
CERTIFICATE OF CORRECTION

PATENT NO. : 5,070,121
DATED : December 3, 1991
INVENTOR(S) : HINTERWALDNER ET AL.

It is certified that error appears in the above-identified patent and that said Letters Patent is hereby corrected as shown below:

Col. 33, claim 1, line 18, "compounds" should read
--components--.

Col. 38, claim 29, line 4, "monomer" should read
--monomers--.

Signed and Sealed this

Ninth Day of March, 1993

Attest:

STEPHEN G. KUNIN

*Attesting Officer*     *Acting Commissioner of Patents and Trademarks*